(12) United States Patent
Nakajima

(10) Patent No.: US 7,956,882 B2
(45) Date of Patent: Jun. 7, 2011

(54) MULTIPLE-BEAM SCANNING DEVICE AND IMAGE FORMING APPARATUS HAVING THE MULTIPLE-BEAM SCANNING DEVICE

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1090 days.

(21) Appl. No.: 11/637,140

(22) Filed: Dec. 12, 2006

(65) Prior Publication Data
US 2007/0146738 A1    Jun. 28, 2007

(30) Foreign Application Priority Data

Dec. 22, 2005    (JP) .................................. 2005-370047

(51) Int. Cl.
*B41J 2/47* (2006.01)
*B41J 2/435* (2006.01)

(52) U.S. Cl. ........................................ 347/234; 347/248
(58) Field of Classification Search .................. 347/233, 347/261, 234, 248
See application file for complete search history.

(56) References Cited

U.S. PATENT DOCUMENTS

| 5,691,761 | A  | * | 11/1997 | Fisli .............................. 347/241 |
| 6,433,809 | B1 | * | 8/2002  | Kodama ........................ 347/233 |
| 6,590,598 | B2 | * | 7/2003  | Kodama ........................ 347/234 |
| 6,972,783 | B2 | * | 12/2005 | Takamatsu et al. ........... 347/233 |
| 2010/0060711 | A1 | * | 3/2010  | Shibuya et al. ............... 347/233 |

FOREIGN PATENT DOCUMENTS

| JP | 04-149522    | 5/1992  |
| JP | 04-149523    | 5/1992  |
| JP | 2002-341273  | 11/2002 |
| JP | 2003-182139  | 7/2003  |
| JP | 2003-205642  | 7/2003  |

* cited by examiner

*Primary Examiner* — Uyen-Chau N Le
*Assistant Examiner* — John M Bedtelyon
(74) *Attorney, Agent, or Firm* — Dickstein Shapiro LLP

(57) ABSTRACT

A multi-beam scanning device includes a light source part having a plurality of light emitting sources which light emitting sources are monolithically arranged in a surface perpendicular to an optical axis; a light deflection part configured to deflect a plurality of light beams from the light source part in a lump and scan an image carrier surface; and an image-formation optical system where lateral magnification is set so that beam spots of the plural light beams are arranged at a designated pitch in a sub-scanning direction on the image carrier surface.

13 Claims, 16 Drawing Sheets

MULTIPLE-BEAM SCANNING DEVICE AND IMAGE FORMING APPARATUS HAVING THE MULTIPLE-BEAM SCANNING DEVICE

BACKGROUND OF THE INVENTION

1. Field of the Invention

The present invention generally relates to multiple-beam scanning devices and image forming apparatuses having the multiple-beam scanning devices. More specifically, the present invention relates to a scanning device used for a writing system of an image forming apparatus such as a digital copier, a laser plotter, a facsimile, or a multiple functional product thereof. Especially, the present invention relates to a multiple-beam scanning device whereby plural optical beams are simultaneously scanned so that an image is written on an image carrier body surface at a high speed, and the image forming apparatus having the multiple-beam scanning device.

2. Description of the Related Art

In tandem type multiple-color image forming apparatus as disclosed in, for example, Japanese Laid-Open Patent Application No. 2002-341273, image carrier bodies such as photosensitive drums corresponding to each of colors such as yellow, magenta, cyan, or black are arranged in a conveyance direction of a transferred body and toner images formed by image forming parts (imaging forming stations) of each of the colors are overlapped. Therefore, a color image can be formed by a single path and high speed image forming can be conducted.

On the other hand, a multiple-beam scanning device has been suggested as a high speed optical scanning device. In the multiple-beam scanning device, since plural beams are scanned in a lump, it is possible to simultaneously record plural neighboring lines and high speed scanning can be conducted without raising the rotational speed of a polygon scanner as an optical deflection part.

However, in the multiple-beam scanning device, a belt area corresponding to the number of beams arranged in the sub-scanning direction is scanned by a single scanning of the polygon scanner. Therefore, if a joint part of a "n"th scanning area and neighboring "n+1"th or "n−1"th scanning area is shifted due to vibration or face tangle of a polygon mirror forming the polygon scanner, arrangement of pixels forming dots in an area corresponding to the joint part and other areas become irregular. Alternatively, the sizes of pixels become uneven so that concentration unevenness or color change may occur.

In addition, generally, the diameter of a beam spot is larger than an interval of scanning lines and a photosensitive body is exposed so that parts of the beam spots are overlapped at the neighboring scanning lines. Therefore, the amount of electrical charge remaining as an electrostatic latent image due to reciprocal law failure of the photosensitive body of a line image formed by a single scanning by a single surface of the polygon mirror is different from that of a line image formed with a certain time by plural scanning even in a neighboring surface. The density of the line image formed with the certain time by plural scanning even in the neighboring surface may be higher.

As a method for avoiding color change or the density unevenness at the joint part in the scanning area of each of surfaces of the polygon mirror standing out, several examples have been suggested. For example, Japanese Patent No. 2685345 discloses an example where the light amount of a light beam is changeable corresponding to the joint part.

Japanese Patent No. 2628934 discloses an example where an interval of a light beam is changeable corresponding to the joint part.

In addition, Japanese Laid-Open Patent Application Publication No. 2003-205642 discloses an example where a light source part generating a supplemental beam separately from a recording beam is provided so that the reciprocal law failure is not generated. Furthermore, Japanese Laid-Open Patent Application Publication No. 2005-182139 discloses an example of use of a VCSEL (vertical cavity surface emitting laser) where plural light emitting sources are arranged two-dimensionally.

Recently, acceleration in the multiple-color image forming apparatus has been progressing. Since the multiple-color image forming apparatus is used for simple printing as an on-demand printing system, high quality image and prevention of the density unevenness and color change are required.

Because of this, a memory storing image information larger than the number of lines scanned by a single surface of the polygon mirror forming the polygon scanner is provided in advance, and a pixel of a dot formed by scanning even the neighboring surface is extracted, and a light amount is switched as discussed in Japanese Patent No. 2685345, so that the joint part may not stand out.

However, memory capacity or a processing circuit for determining the pixel of the joint part is necessary so that cost may be raised. In addition, since a large amount of data is processed, time required for this process cannot be ignored from the perspective of improvement of the printing speed. Furthermore, there is no solution to change of a pitch between an end line of scanning on an optional surface generated by an unexpected reason such as vibration of the polygon scanner and a head line of scanning on a neighboring surface.

SUMMARY OF THE INVENTION

Accordingly, embodiments of the present invention may provide a novel and useful multiple-beam scanning device and image forming apparatus having the multiple-beam scanning device solving one or more of the problems discussed above.

More specifically, the embodiments of the present invention may provide a multiple-beam scanning device and an image forming apparatus having the multiple-beam scanning device, in which multiple-beam scanning device i) an overlapping area over plural lines is provided in a scanning area of an optional surface of a light deflection part such as a polygon scanner and a scanning area of a neighboring surface, and thereby it is difficult to distinguish a pixel of a joint part; and ii) it is possible to implement high quality image forming without density unevenness or color change by making the joint part difficult to be distinguished in advance even if there is an unexpected reason such as vibration of the light deflection part.

The embodiments of the present invention may also provide a tandem type image forming apparatus configured to overlap toner images formed on plural image carrier body surfaces so as to form a color image whereby there is no need to individually control corresponding to each of the image carrier body surfaces and the light deflection part and the light source can be commonly used so that productivity can be improved.

One aspect of the present invention may be to provide a multi-beam scanning device, including: a light source part having a plurality of light emitting sources which light emitting sources are monolithically arranged in a surface perpendicular to an optical axis; a light deflection part configured to deflect a plurality of light beams from the light source part in a lump and scan an image carrier surface; and an image-formation optical system where lateral magnification is set so that beam spots of the plural light beams are arranged at a designated pitch in a sub-scanning direction on the image carrier surface; wherein the image carrier surface is moved in the sub-scanning direction corresponding to main scanning by the light deflection part; and image forming is implemented so that a boundary part of a scanning area scanned on an optional surface of the light deflection part and a scanning area scanned on a neighboring surface are overlapped at least by one scanning line gap on the image carrier surface.

Another aspect of the present invention may be to provide an image forming device, including: an optical scanning device configured to deflect a light beam from a light source part by a light deflection part; an image carrier where an electrostatic latent image is formed by the light beam; a developing part configured to develop the electrostatic latent image on the image carrier by a developer; and a transferring part configured to transfer the image developed on the image carrier to a recording medium directly or via an intermediate transferring body; wherein a multi-beam scanning device is provided as the optical scanning device.

According to the embodiments of the present invention, it is possible to provide a multiple-beam scanning device and an image forming apparatus having the multiple-beam scanning device, in which multiple-beam scanning device i) an overlapping area over plural lines is provided in a scanning area of an optional surface of a light deflection part such as a polygon scanner and a scanning area of a neighboring surface, and thereby it is difficult to distinguish a pixel of a joint part; and ii) it is possible to implement high quality image forming without density unevenness or color change by making the joint part difficult to be distinguished in advance even if there is an unexpected reason such as vibration of the light deflection part.

According to the embodiments of the present invention, it is also possible to provide a tandem type image forming apparatus configured to overlap toner images formed on plural image carrier body surfaces so as to form a color image whereby there is no need to individually control corresponding to each of the image carrier body surfaces and the light deflection part and the light source can be commonly used so that productivity can be improved.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to FIG. 1 through FIG. 16

Figure 1:
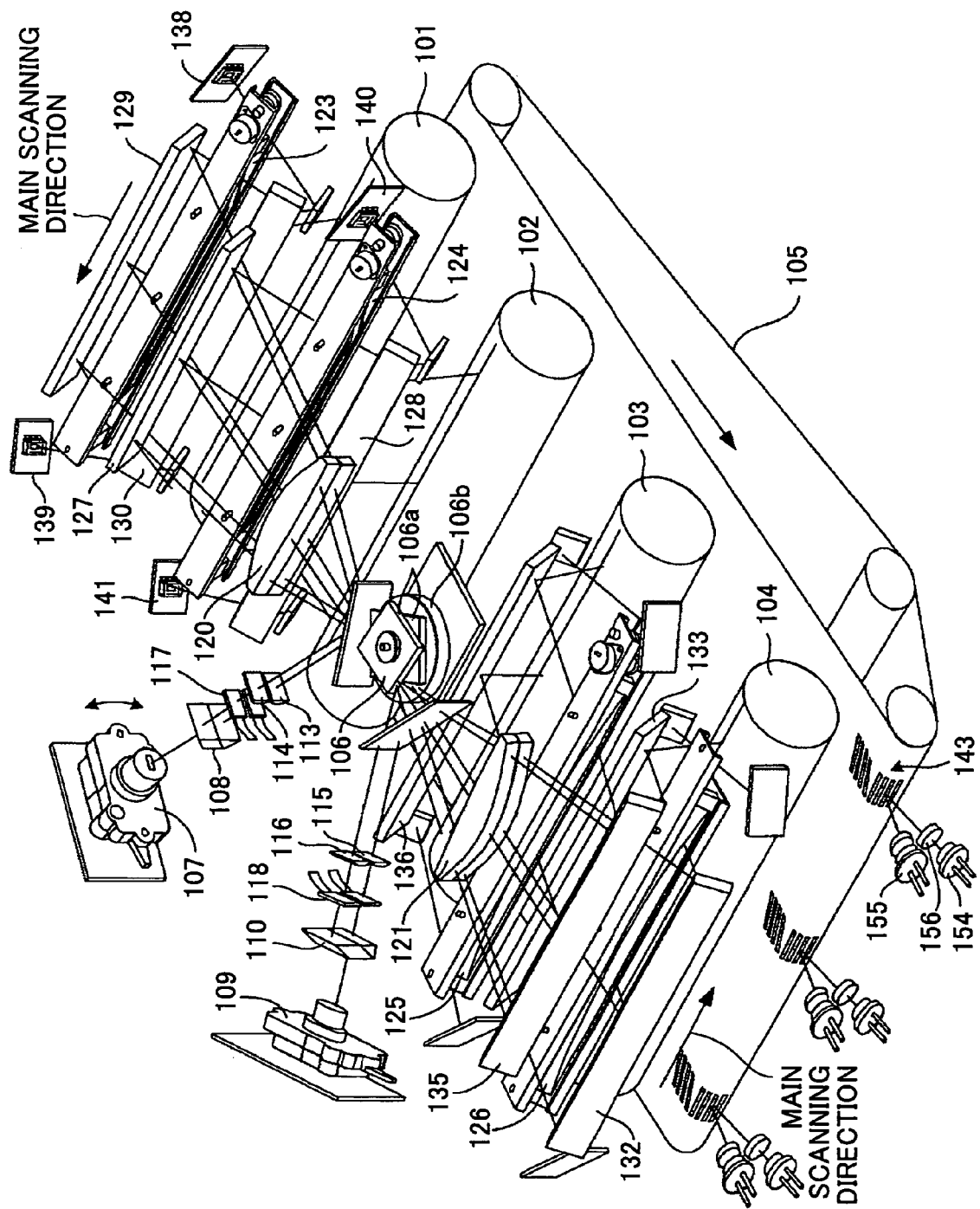
FIG. 1 is a schematic structural view of a multiple-beam scanning device of an embodiment of the present invention.

FIG. 1 is a schematic structural view of an optical scanning device (a multiple-beam scanning device) configured to scan image carrier bodies (photoconductive photosensitive drums, for example) of four image forming parts (image forming stations) of an embodiment of the present invention. More specifically, FIG. 1 shows an example of a structure of a unified optical scanning unit wherein plural light beams, corresponding to four stations, from a light source unit are scanned by a polygon mirror (polygonal rotating mirror) of a single polygon scanner so that the photosensitive drums of the four stations are scanned.

Photosensitive drums 101, 102, 103, and 104 of four image forming stations are arranged at even intervals along a moving direction indicated by an arrow of a transcription part 105 (for example, an intermediate transcription belt or a transcription belt configured to carry and convey a recording medium). The photosensitive drums 101, 102, 103, and 104 toner images having different colors and formed on the photosensitive drums 101, 102, 103, and 104 are transcribed to the intermediate transcription belt or the recording medium conveyed by the transcription belt and overlapped (superposed) so that full color images are formed.

As shown in FIG. 1, the optical scanning device (multi-beam scanning device) configured to scan the photosensitive drums 101, 102, 103, and 104 is formed in a unified manner. A polygon scanner having a two-step structure rotates a polygon mirror 106a by a polygon motor 106b so that each light beam is scanned.

Light source units 107 and 109 each provide light beams to two corresponding stations configured to scan in the same direction, By light flux splitting prisms 108 and 110, light beams are diverged to upper and lower steps corresponding to upper and lower surfaces of the above-mentioned polygon mirror 106a, so that the images corresponding to the stations are mutually formed on the photosensitive drums 101, 102, 103, and 104.

The light source units 107 and 109, toroidal lenses 123, 124, 125, and 126, and fθ lenses 120 and 121 forming an image formation system are arranged in a symmetric manner about a symmetric surface parallel with the photosensitive drums axes and including the rotational axis of the polygon mirror 106a. The light beams from the light source units 107 and 109 are deflected in antithetical directions by the polygon mirror 106a so as to be led to the corresponding photosensitive drums 101, 102, 103, and 104.

Therefore, the scanning directions of the stations become the antithetical directions by the corresponding photosensitive drums. The width of a recording area, namely magnification in a main scanning direction, is adjusted so that an electrostatic latent image is written by matching a scanning starting position end and a scanning ending position.

Figure 2:
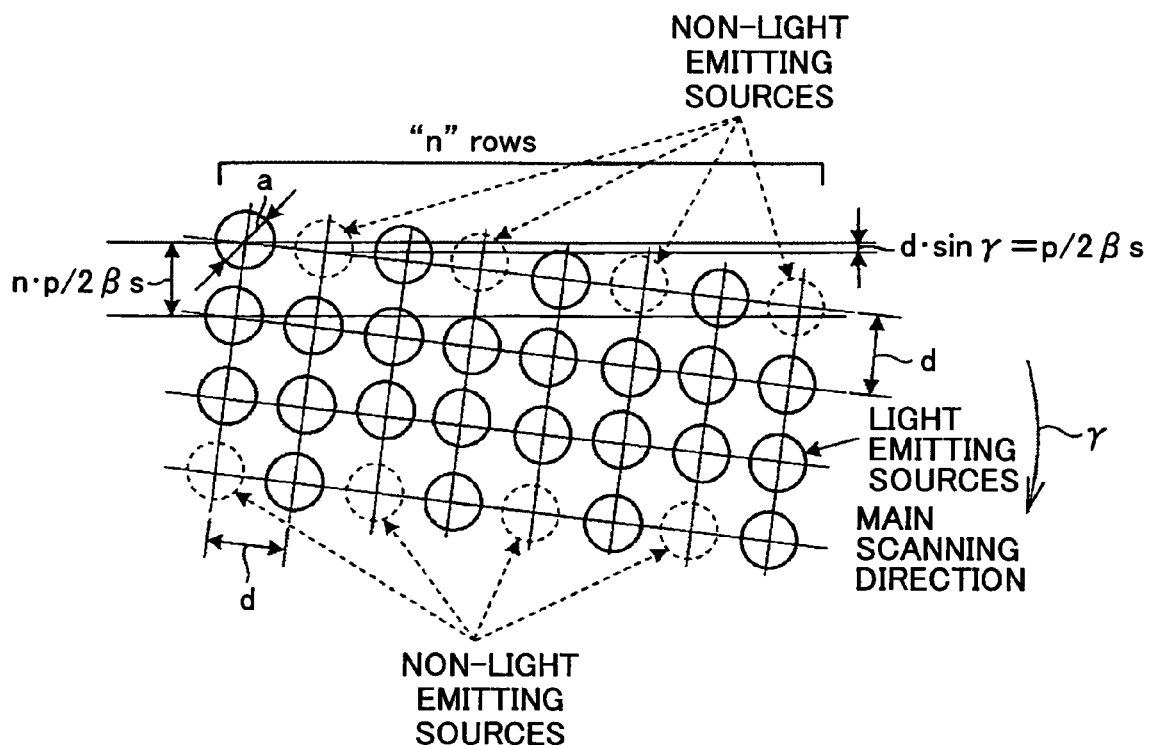
FIG. 2 is a view showing an example of arrangement of a light emitting source of a VCSEL (vertical cavity surface emitting laser) used as a light source unit of the multiple-beam scanning device shown in FIG. 1.

FIG. 2 is a view showing an example of the arrangement of a light emitting source of a VCSEL (vertical cavity surface emitting laser) used as the light source unit of the multiple-beam scanning device shown in FIG. 1. As shown in FIG. 2, a VCSEL (vertical cavity surface emitting laser) is provided in the embodiment of the present invention. The VCSEL has a light emitting source of "n" rows and "m" lines provided in the light source unit in a matrix at even intervals "d" in main scanning and sub-scanning directions as a multi-beam light source configured to expose each of the photosensitive drums 101, 102, 103, and 104. In the example shown in FIG. 2, even-numbered rows of a first line and odd-numbered rows of a fourth line among 32 light emitting sources two-dimensionally (8 rows and 4 lines) arranged at even intervals are dummy light sources not used for image forming and 24 light emitting sources are actually used for image forming. The entirety of the light source unit is tilted at angle "γ". This inclination is adjusted so that a pitch "p" between beam spots in the sub-scanning direction on the photosensitive drum is matched with a scanning line pitch corresponding to a recording density and 24 lines are simultaneously scanned for each multi-beam light source.

Here, the amount γ of inclination is expressed by the following formula wherein a sub-scanning magnification of the entirety of an optical system is defined as δs.

$$\sin \gamma = (\cos \gamma)/n = p/d \cdot \delta s$$

The shift of the position of the light emitting source in a main scanning direction can be made to correspond by delaying start writing timings in turn where the beams detected by optical detection sensors 138 and 140 first are standard.

In a manufacturing process of the VCSEL, an arrangement direction of light emitting points may be tilted at designated angles in advance so that the shift of the position of the light emitting source in the main scanning direction may be prevented.

In a liquid deflection element 117 (118), since only a deflection element in an arrangement direction of liquid crystal performs deflection, a deflection direction of the light emitting source is arranged in a single direction.

Figure 3:
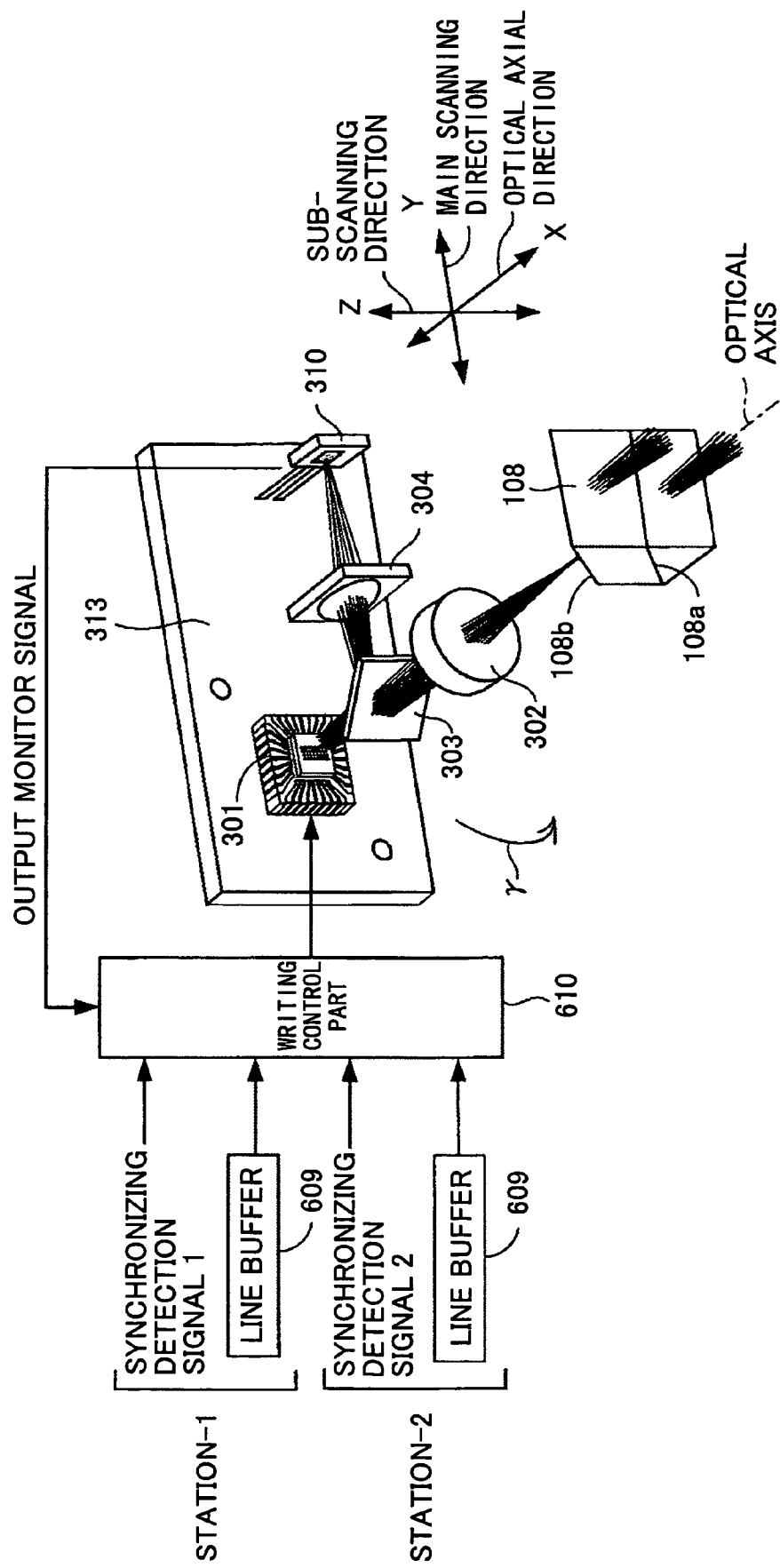
FIG. 3 is a view showing an example of a structure of the light source unit of the multiple-beam scanning device shown in FIG. 1.

FIG. 3 is a view showing an example of a structure of the light source unit of the multiple-beam scanning device shown in FIG. 1. The light flux splitting prism 108 (110) has, as shown in FIG. 3, a half mirror surface 108a and a mirror surface 108b parallel with the half mirror surface 108a. Half of the light amount of plural beams 201 from the light source unit 107 (109) are reflected by the half mirror surface 108a and the mirror surface 108b and the remaining half of the light amount of the plural beams 201 permeate the half mirror surface 108a and the mirror surface 108b and split to upper and lower parts so as to come out at a designated interval in the sub-scanning direction while directions of the lights are arranged.

In this example, the designated interval as well as an upper and lower gap of the fθ lens and the polygon mirror is approximately 6 mm.

As shown in FIG. 1, the liquid deflection elements 117 (118) are arranged at upper and lower parts of exit surfaces of the light flux splitting prism 108 (110). When a voltage is applied, an electric potential distribution is generated in the sub-scanning direction so that an orientation of liquid crystal is changed. As a result of this, a refractive-index distribution is generated and the direction of a light beam can be inclined. Hence, a scanning position on the photosensitive drum surface can be changed depending on an applied voltage. A liquid crystal deflection element is discussed below.

The cylinder lenses 113 and 114 are provided in two steps corresponding to split light beams. One of the cylinder lenses 113 and 114 is attached so as to be rotatably adjusted where an optical axis is the center of rotation. The cylinder lenses 113 and 114 can be adjusted so that focal lines of the lenses 113 and 114 become parallel to each other. The lights are incident on the polygon mirrors 106a formed in a two-step manner at an interval of 6 mm in the sub-scanning direction.

The cylinder lenses 113 and 114 (115 and 116) have at least positive curvature in the sub-scanning direction. The beam is converged on the polygon mirror 106a. The toroidal lenses 123 through 126 and the cylinder lenses 113 through 116 form an optical face tangle error correction unit for the laser scanning system wherein a deflection point and a photosensitive body surface are in conjugate relationships in the sub-scanning direction.

The polygon mirror 106a is formed by four deflection surfaces and plural beams from light emitting point lines are deflected in a lump by the same deflection surface for scanning. Phases of upper and lower polygon mirrors are shifted 45 degrees relative to each other and scanning of the optical beam is mutually conducted by upper and lower steps.

An image formation optical system includes a fθ lens 120 (121) and toroidal lenses 123 and 124 (125 and 126) which are formed by plastic molding. The fθ lens 120 (121) has a two-layer stacking structure and a non-circular shaped configuration so as to have a power whereby a beam moves on the photosensitive body surface at a constant speed in a main scanning direction accompanying the rotation of the polygon mirror 106a.

The scanning beams passing through the toroidal lenses 123 and 124 (125 and 126) enter optical detection sensors 138 and 140 provided at a scanning starting side and optical detection sensors 139 and 141 provided at a scanning ending side. Based on the detection signals of the optical detection sensors 138 and 140, synchronizing detection signals for light emitting sources are generated and timing of start writing is made.

Detection time difference of the light beams from the optical detection sensors 138 and 140 provided at the scanning starting sides is measured for comparison with a predetermined standard value and the pixel clock modulating the light emitting source can be changed, so that the detection signals of the light detections sensors 139 and 141 provided at the scanning ending sides correct the shift of magnification in the main scanning direction.

Figure 4:
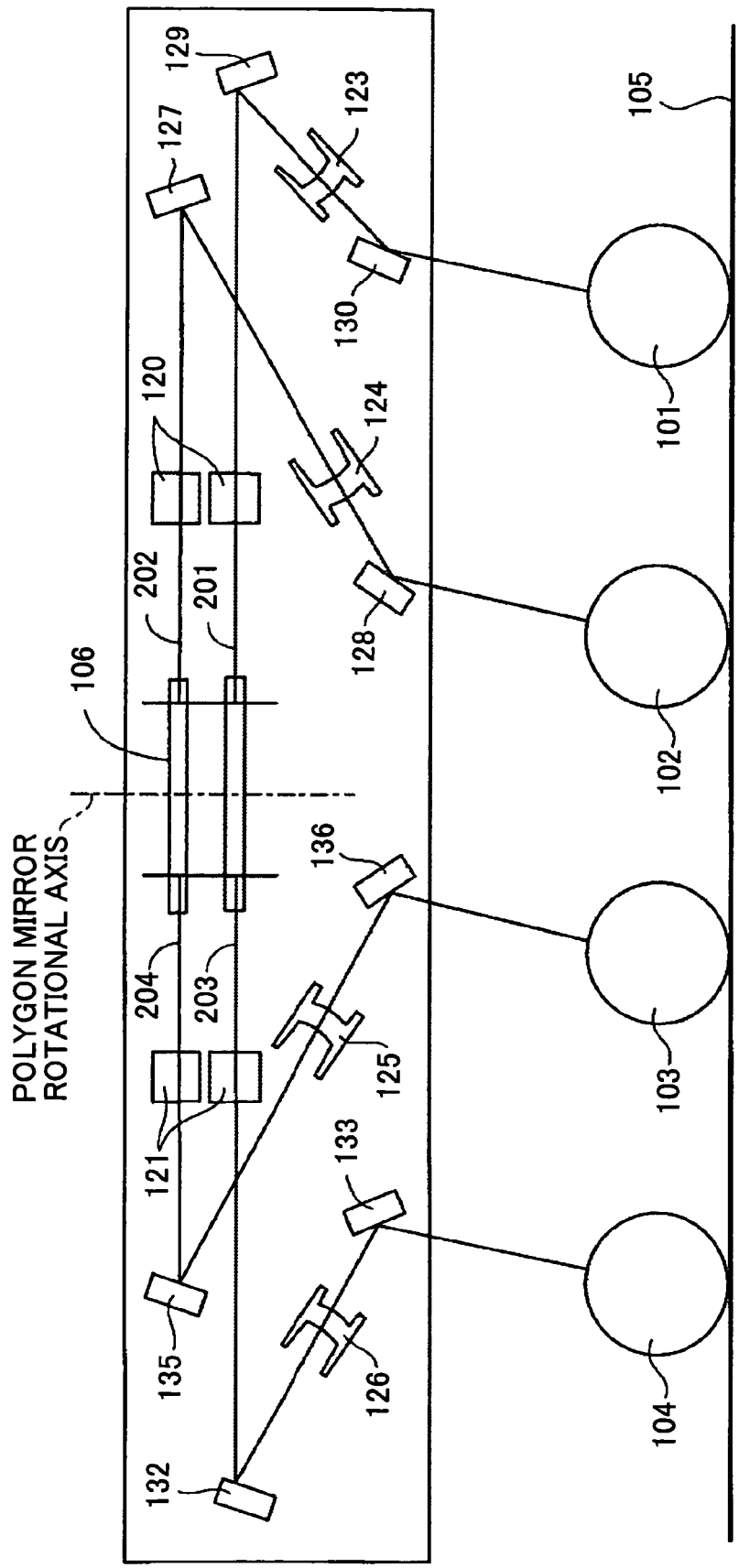
FIG. 4 is a view showing paths of light beams in a sub-scanning cross section of the multiple-beam scanning device shown in FIG. 1.

FIG. 3 is a view showing an example of a structure of the light source unit of the multiple-beam scanning device shown in FIG. 1. FIG. 4 is a view showing paths of light beams in a sub-scanning cross section (namely a cross section parallel with the sub-scanning direction) of the multiple-beam scanning device shown in FIG. 1.

Plural light emitting sources 301 shown in FIG. 3 are arranged in a symmetrical manner about the optical axis of the coupling lens 302. Lights converted to a parallel light flux by the coupling lens 302 come out from the light source unit 107 (109), and the lights are converged in the vicinity of a rear side focus of the coupling lens 302. While the light beam interval is made wide in a main scanning direction, the light enters the fθ lens 120 (121). In the sub-scanning direction, the light is re-converged in the vicinity of a polygon mirror deflection surface by the cylinder lenses 113 and 114 (115 and 116) so as to be incident on the fθ lens 120 (121).

In addition, as discussed above, plural light beams from the light source unit 107 (109) are split upper and lower in the sub-scanning direction by the light flux splitting prism 108 (110) so as to be led to the photosensitive drums corresponding to the stations.

The beam 201 from plural light emitting sources coming out from a lower step of the light flux splitting prism 108 is deflected and scanned at the lower step of the polygon mirror 106a via the cylinder lens 113. The beam 201 passes through the lower step of the fθ lens 120 and is incident on the toroidal lens 123 by a returning mirror 129. The beam 201 forms an image with spots on the photosensitive drum 101 via the returning mirror 130. A latent image corresponding to yellow color image information is formed as a first image forming station.

The beam 202 from plural light emitting sources coming out from an upper step of the light flux splitting prism 108 is deflected and scanned at the upper step of the polygon mirror 106a via the cylinder lens 114. The beam 202 passes through the upper step of the fθ lens 120 and is incident on the toroidal lens 124 by a returning mirror 127. The beam 202 forms an image with spots on the photosensitive drum 102 via the returning mirror 128. A latent image corresponding to magenta color image information is formed as a second image forming station.

Similarly, at the stations facing each other via the polygon mirror 106a, plural light beams from the light source unit 109 are split upper and lower by the light flux splitting prism 110 so as to be led to the photosensitive drums corresponding to the stations.

That is, the beam 203 from plural light emitting sources coming out from a lower step of the light flux splitting prism 110 is deflected and scanned at the lower step of the polygon mirror 106a via the cylinder lens 115. The beam 203 passes through the lower step of the fθ lens 121 and is incident on the toroidal lens 126 by a returning mirror 132. The beam 203 forms an image with spots on the photosensitive drum 104 via the returning mirror 133. A latent image corresponding to black color image information is formed as a fourth image forming station.

The beam 204 from plural light emitting sources coming out from an upper step of the light flux splitting prism 110 is deflected and scanned at the upper step of the polygon mirror 106a via the cylinder lens 116. The beam 204 passes through the upper step of the fθ lens 120 and is incident on the toroidal lens 126 by a returning mirror 135. The beam 204 forms an image with spots on the photosensitive drum 103 via the returning mirror 136. A latent image corresponding to cyan color image information is formed as a third image forming station.

Figure 5:
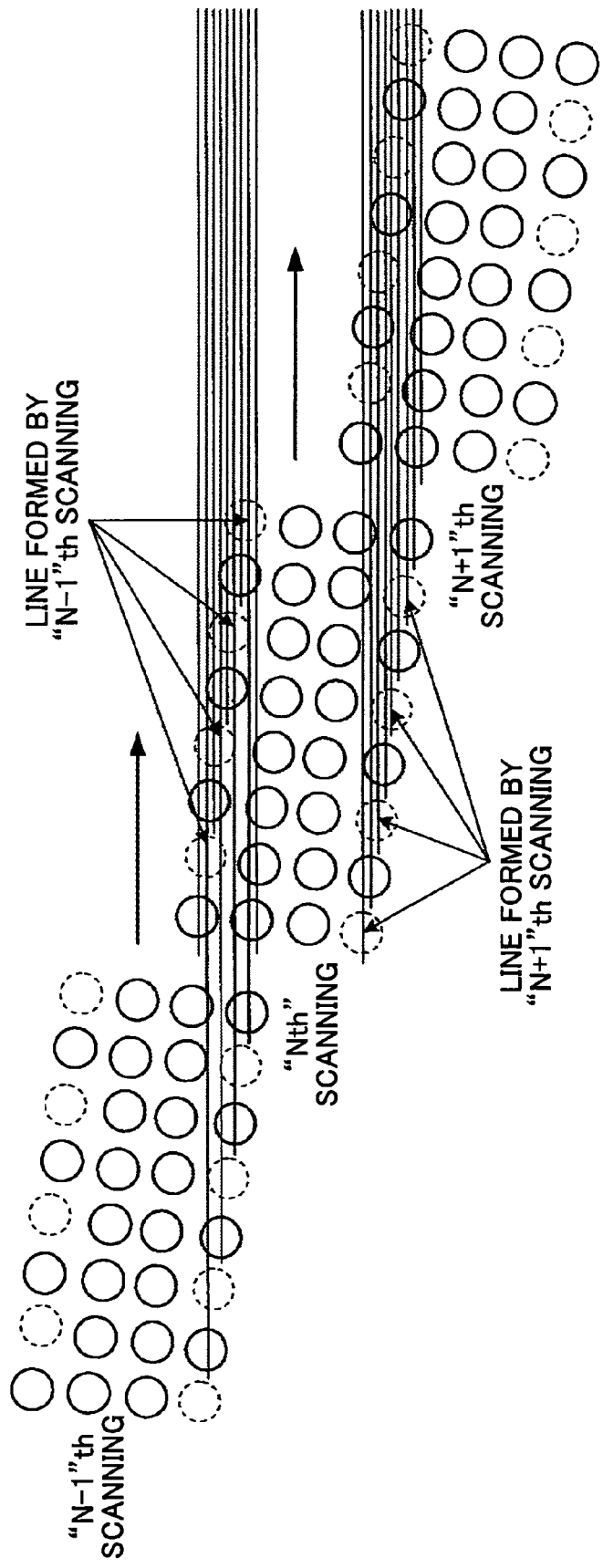
FIG. 5 is a view showing relationship between a scanning area of each surface of a polygon mirror and a scanning trace of each of the light emitting sources of the VCSEL (vertical cavity surface emitting laser), in the multiple-beam scanning device shown in FIG. 1.

FIG. 5 is a view showing relationship between a scanning area of each surface of the polygon mirror 106a and a scanning trace of each of the light emitting sources of the VCSEL (vertical cavity surface emitting laser), in the multiple-beam scanning device shown in FIG. 1.

As discussed above, in the VCSEL (vertical cavity surface emitting laser) array, light emitting sources of "n" rows (eight rows in this example) in the main scanning direction and "m" lines (four lines in this example) in the sub-scanning direction are arranged. As overlapping with a neighboring surface of the polygon mirror 106, an image is formed so that the scanning track at the end of a line at "N"th scanning and the scanning track at the head of a line at "N+1"th scanning are mixed on the photosensitive body surface.

In this example, in the overlapping area, the mixture occurs every k(=4) lines. In the "N"th scanning, twenty four lines, namely $1^{st}$, $3^{rd}$, $5^{th}$, $7^{th}$, $9^{th}$ through $24^{th}$, $26^{th}$, $28^{th}$, $30^{th}$, and $32^{nd}$ lines, are simultaneously scanned. The "N−1"th scanning is applied to the $2^{nd}$, $4^{th}$, $6^{th}$ and $8^{th}$ lines. The "N+1"th scanning is applied to the $25^{th}$, $27^{th}$, $29^{th}$ and $31^{st}$ lines.

Because of this, a beam spot pitch in the sub-scanning direction corresponding to the $1^{st}$ and "n"th light emitting sources of the VCSEL (vertical cavity surface emitting laser) array is twice the beam spot gap corresponding to other light emitting sources. A beam spot scanned by a neighboring polygon mirror surface is arranged mutually or for every single line in the intermediate position.

While the beam spot is arranged every single line in this example, the beam spot may be arranged every plural lines.

In order to realize such a scanning, it is necessary to make a gap of scanning tracks between the head beam ($1^{st}$ line) and the end beam ($32^{nd}$ line) in the sub-scanning direction scanned by a single surface of the polygon mirror 106 greater than the moving distance of the photosensitive body surface during a single surface scanning of the polygon mirror 106.

In addition, in order to make the sub-scanning intervals have constant pitches corresponding to the recording density, the rotational speed of the polygon mirror 106, R (rpm), may be set as follows.

The rotational speed of the polygon mirror 106, R (rpm), is defined as follows wherein the recording density in the sub-scanning direction is defined as "Dp (dpi)", the moving speed of the photosensitive body surface is defined as "V (mm/s)", and the number of surfaces of the polygon mirror 106 is defined as "N".

$$R=(Dp/25.4)\cdot V\cdot(60/N)/(m\cdot n-2k)$$

The scanning frequency is set so that 2k lines are overlapped.

Next, a structure of the light source unit 107 (109) is discussed with reference to FIG. 3. Plural light beams from a VCSEL (vertical cavity surface emitting laser) array 301 arranged two-dimensionally and monolithically are, right before entering the coupling lens 302, split into an S polarization element and a P polarization element by a diverging mirror 303 forming a polarization separation surface. The passing S polarization elements are arranged in a symmetrical manner about the optical axis by adjustment in the x, y, and Z directions of the coupling lens 302 so as to come out as parallel light flux.

On the other hand, the P polarization element deflected by the diverging mirror 303 is detected via the convergent lens 304 by the optical detection sensor 310 standing at a control board 313 where the VCSEL (vertical cavity surface emitting laser) array 301 is mounted, so as to be sent to a writing control part 610 as an output monitor signal. The writing control part 610 turns on the light emitting source in time sequence to detect beam intensity after scanning on the surface of the polygon mirror 106 is started but before scanning reaches the imaging area. The writing control part 610 sets an electrical current so that an output of the light emitting source has a designated value compared to the standard value.

The set electrical current is held until scanning in the imaging area ends. The electrical current is reset at the time of next scanning at the polygon mirror surface 106, so that the beam intensity can be kept constant.

As discussed above, in this example, a part of the scanning area scanned by a neighboring surface of the polygon mirror is overlapped for image forming. A standard value of the beam intensity at a light emitting source corresponding to the overlapping area, namely the light emitting sources of the first and nth lines of the VCSEL (vertical cavity surface emitting laser) array is set in advance so that a recording density in an overlapping area is substantially the same as that in an non-overlapping area.

In the control board 313, a power control circuit for holding a light emitting output of the light emitting source constant and a driving circuit for modulating the light emitting source corresponding to the image information are formed. The power control circuit and the driving circuit are held in a body with the coupling lens 302 so as to form the light source unit 107 (109).

As discussed above, in order to make deviation of the curved amount be less than the permitted value, the arrangement number "m" in the sub-scanning direction of the light emitting sources of the VCSEL (vertical cavity surface emitting laser) array 301 is limited and the arrangement number "n" in the main scanning direction should be greater.

Because of this, if the light emitting sources are not arranged in a surface perpendicular to the optical axis of the coupling lens 302, a focusing state of the beam coming out from the coupling lens 302 differs depending on the light emitting sources. The image forming position is shifted from the photosensitive body surface so that deviation of the beam spot diameter is made and periodic density unevenness is generated, Alternatively, image degradation such as change of color occurs depending on which light emitting source the head line is recorded.

Because of this, in this example, by arranging the focusing state of the light emitting sources arranged at an end in the main scanning direction, the light emitting sources are oriented about the coupling lens 302.

Figure 6:
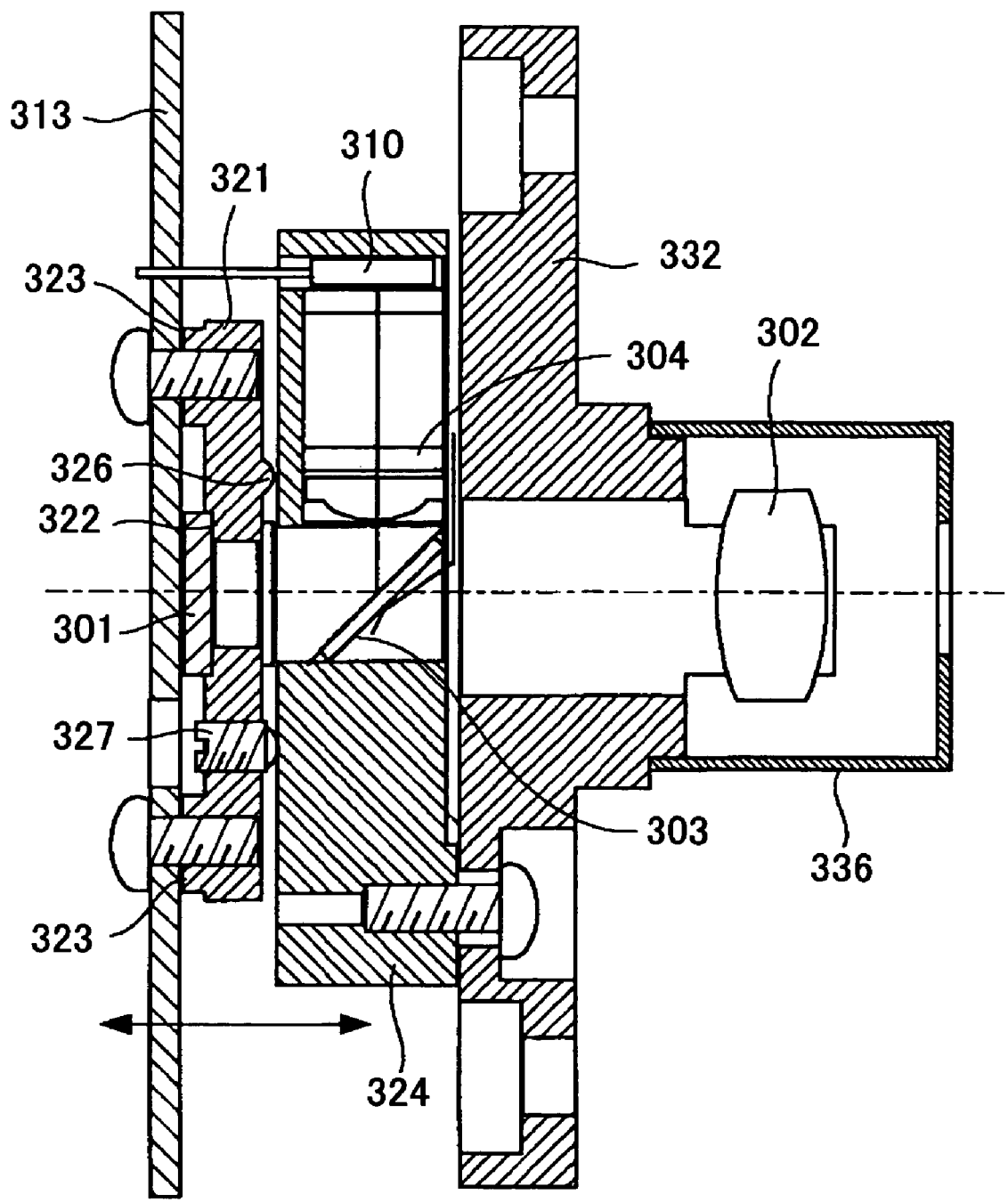
FIG. 6 is a view showing a main scanning cross section of the light source unit of the multiple-beam scanning device shown in FIG. 1.

FIG. 6 is a view showing a main scanning cross section, namely a cross section parallel with the main scanning direction, of the light source unit 107 (109) of the multiple-beam scanning device shown in FIG. 1.

This light source unit has a structure where a holder member 332 and a base member are connected by a standard surface perpendicular to the optical axis of the coupling lens 302 and fixed by screws. The holder member 332 holds the coupling lens 302. The base member holds the control board 313 where the VCSEL (vertical cavity surface emitting laser) array 301 is mounted.

The base member includes a first member 321 holding the control board 313 and a second member 324. The base member is formed by an aluminum die-casting. The splitting mirror 303, the flux lens 304, and the optical detection sensor 310 are installed in the second member 324.

The VCSEL (vertical cavity surface emitting laser) array 301 has a structure where a chip having a light emitting source provided on a substrate surface is received in a ceramic package having lead terminals. A surface formed in parallel with an arrangement surface of the light emitting source comes in contact with a contact surface 322 formed in the first member 321 and the control board 313 is fixed by screws, in two columns so that the semiconductor laser array is put in the optical axial direction.

The first member 321 is connected to an arrangement surface parallel with the standard surface of the second member 324 by making two contact points arranged in the main scanning direction between which an arranging part of the semiconductor laser array is put, a projection part 326 formed in the first member 321, and a head end part of an adjusting screw 327 engaged with the first member 321 contacting with the arrangement surface of the second member 324. By increasing and reducing the amount of projection of the adjustment screw 327, inclination of the arrangement part of the semiconductor laser array can be adjusted in the main scanning cross section where the projection part 326 is the fulcrum.

By adjustment of this inclination and arrangement of the coupling lens 302, a position of a light emitting point relative to the coupling lens 302 of the light emitting sources arranged at an end in the main scanning direction is adjusted.

Figure 7:
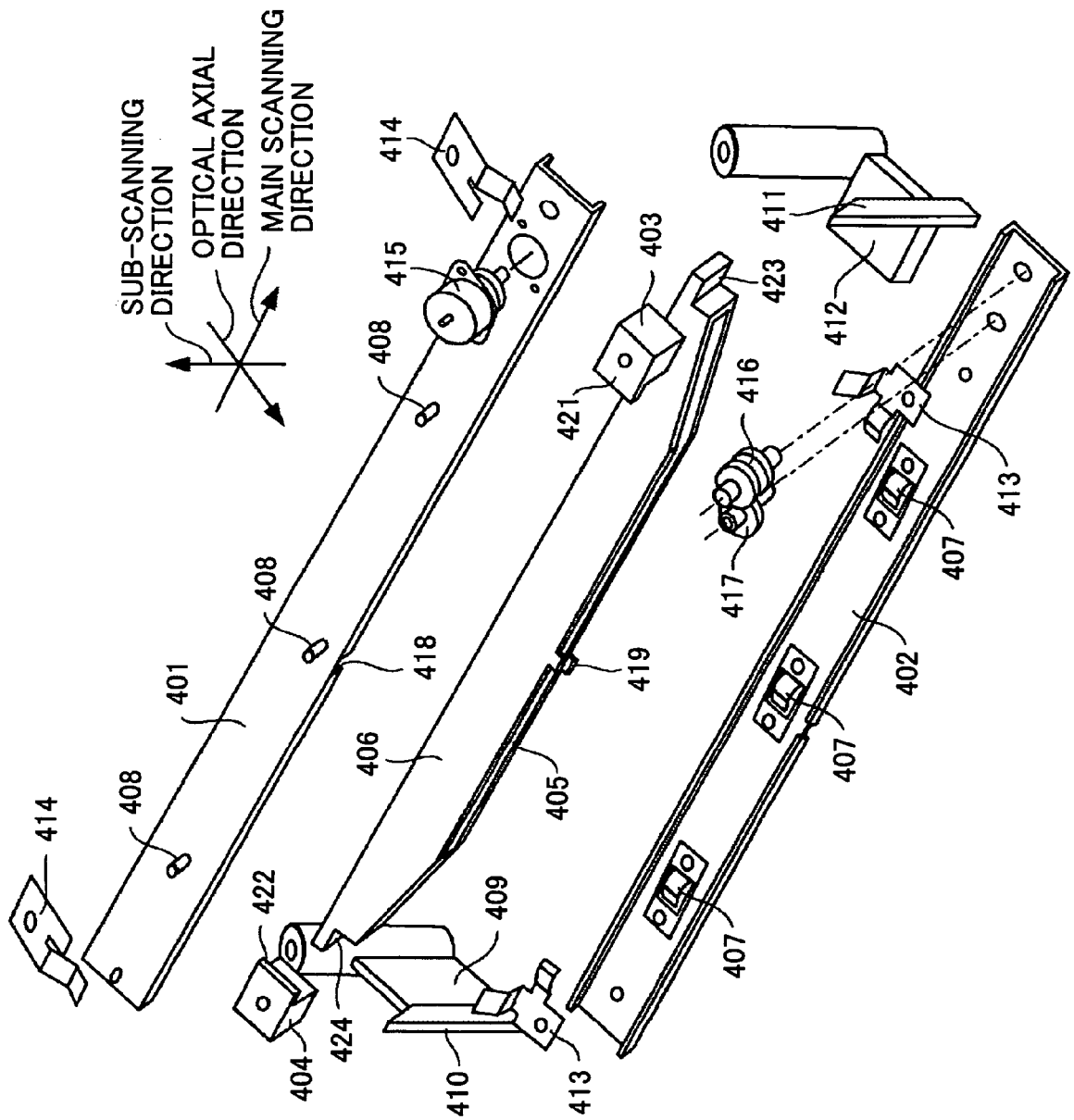
FIG. 7 is an exploded perspective view showing a structural example of a toroidal lens of the multiple-beam scanning device shown in FIG. 1.

FIG. 7 is an exploded perspective view showing a structural example of a toroidal lens of the multiple-beam scanning device shown in FIG. 1. More specifically, FIG. 7 shows a structure example of a supporting body of the toroidal lenses 123, 124, 125, and 126.

As shown in FIG. 7, the toroidal lens 126 has a structure where a rib part 406 is integrally formed so as to surround the lens part 405 and a projection 419 for positioning is formed in the center.

A supporting plate 401 and a pressing plate 402 are formed so as to have rectangular configurations missing one side. The toroidal lens part 405 is received between gap members 403 and 404 facing each other.

The projection 419 formed in the center of the rib part 406 is engaging with a notch part 418 formed in a stand bending part of the supporting plate 401, Surfaces 421 and 422 extending from the gap members 403 and 403 to the inside come in contact with both ends of the rib upper surface so that positioning in the sub-scanning direction of the toroidal lens part 405 is made. Flange parts 423 and 424 projecting from the rib end surface in the longitudinal direction come in contact with the side surfaces of the gap members 403 and 404 so that positioning in the optical axial direction is made. By a pair of the plate springs 413 out between the gap members 403 and 404 and the pressing plate 402, forces are applied in two directions of upper and side surfaces of the toroidal lens part 405 so that both ends are supported. Hence, even with thermal expansion, a longitudinal direction can be freely stretched.

Head ends of the adjustment screws 408 provided in screw holes of the supporting plate 401 come in contact with three portions situated in the center portion and portions with equal intervals with the center portion on the rib upper surface of the toroidal lens part 405. The plate springs 407 provided on the pressing plate 402 are energized from the lower surface of the rib.

The toroidal lens part 405 is long and has low rigidity. Hence, even if a slight stress is applied to the toroidal lens part 405, deformation (wrap) is generated so that deformation occurs due to difference of the thermal expansion ratio accompanying the change of peripheral temperature. Thus, by holding plural portions along the supporting plate 401, a configuration can be maintained stably and linearity of a bus line can be maintained.

The supporting plate 401 is formed so as to be extended to outside of the toroidal lens part 405. An end of the supporting plate 401 is provided at the engaging part standing on the bottom surface of the housing. The supporting plate 401 is positioned by making contact in the sub-scanning direction with a receiving surface 409 and making contact in the optical axial direction with a contacting surface 410. The supporting plate 401 is supported by being energized by a plate spring 414. A stepping motor 415 is fixed to another end of the supporting plate 401. A head of a movable tube 417 engaged with a screw formed in a shaft extending downward pierces an extending part of a pressing plate 402. The head end of the movable tube 417 is positioned by making contact with the bottom surface of the receiving surface 412 formed in the housing bottom surface and making contact in the optical axial direction with the contacting surface 411. The movable tube 417 is energized by the plate spring 414 so as to be fixed to the housing like a bridge.

A head end where the stepping motor 415 is fixed can be deformed in the sub-scanning direction by the rotation of the stepping motor 415.

Because of this, rotation of the toroidal lens part 405 can be adjusted in a γ direction in a surface perpendicular to the optical axis wherein the receiving surface 409 is a fulcrum following the reciprocal rotation of the stepping motor 415. As a result of this, a bus line of the toroidal lens part 405 in the sub-scanning direction is inclined and a scanning line as an image forming position of the toroidal lens part 405 is inclined so that the scanning lines between the stations are corrected so as to be parallel.

At this time, while the movement of the movable tube 417 relative to the rotational angle of the stepping motor 415 is determined by a pitch of the screw, the rotation of the shaft is transmitted to the movable tube 417 via a reduction gear 416 in the embodiment of the present invention in order to obtain better resolution of the inclination correction. The rotation of the stepping motor 415 is transmitted to the first gear provided at the shaft, the second and third gears provided at the reduction gear 416, and the fourth gear provided at the movable tube 417 in this order. Therefore, by making the number of teeth of the first and fourth gears slightly different, the rotational angle of the movable tube 417 relative to the rotational angle of the shaft can be delayed or progressed by this difference. Therefore, it is possible to move a head end of the movable tube by a minute amount. The movable tube 417 and the reduction gear 416 are put between the plates 401 and 402 and rotatably supported.

In this embodiment, for example, by providing the inclination correction mechanism to the toroidal lenses 123, 124, and 125 of the first, second and third stations, the inclination of the scanning line related to the black color is automatically corrected for every other color based on the result of inclination detection.

Figure 8:
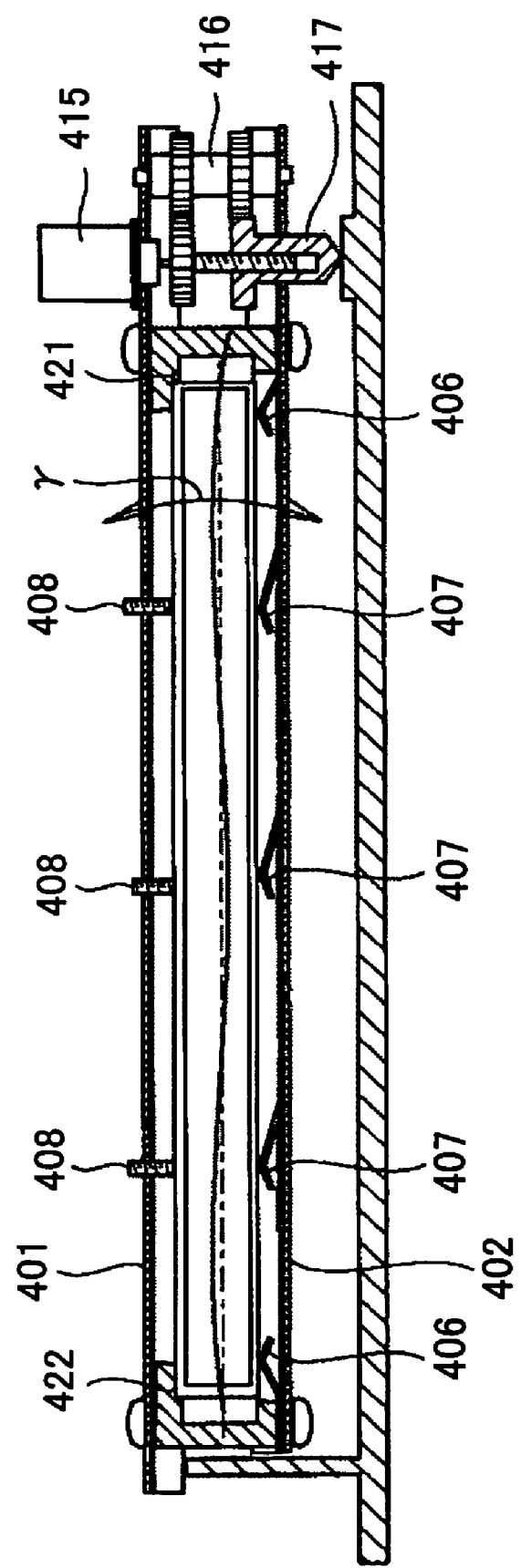
FIG. 8 is a cross-sectional view seen in an optical axial direction of the toroidal lens of the multiple-beam scanning device shown in FIG. 1.

FIG. 8 is a cross-sectional view seen in the optical axial direction of the toroidal lens on the supporting body.

If the projection amounts of three adjusting screws 408 are not sufficient at portions of the arrangement surfaces 421 and 422, the toroidal lens part 405 is curved so that the bus-lines of the toroidal lens are upwardly convex. If the projection amounts of three adjusting screws 408 are large, the toroidal lens part 405 is curved so that the bus-lines of the toroidal lens are downwardly-convex. Therefore, by adjusting these adjusting screws, a focal line of the toroidal lens part 405 is curved in the sub-scanning direction and the curve of the scanning line can be corrected at a high level element.

Generally, the curve of the scanning line may have a simple configuration such as an upper convex type or a lower convex type or a complex configuration such as an M-shaped type, a W-shaped type or a sine wave type because an element due to an arrangement error of an optical element forming an optical system or shift or curve of a surface at the time of forming is contained. The toroidal lens part 405 is curved at three points along the scanning direction for canceling this so that the scanning line on the photosensitive body drum surface is corrected to be a straight line.

In this embodiment, the mechanisms for correcting the curves of the scanning line are provided at the toroidal lenses 123, 124, 125, and 126 and thereby adjustment is made so that a curved configuration between the scanning lines of the stations are arranged at the time of assembling.

Figure 9:
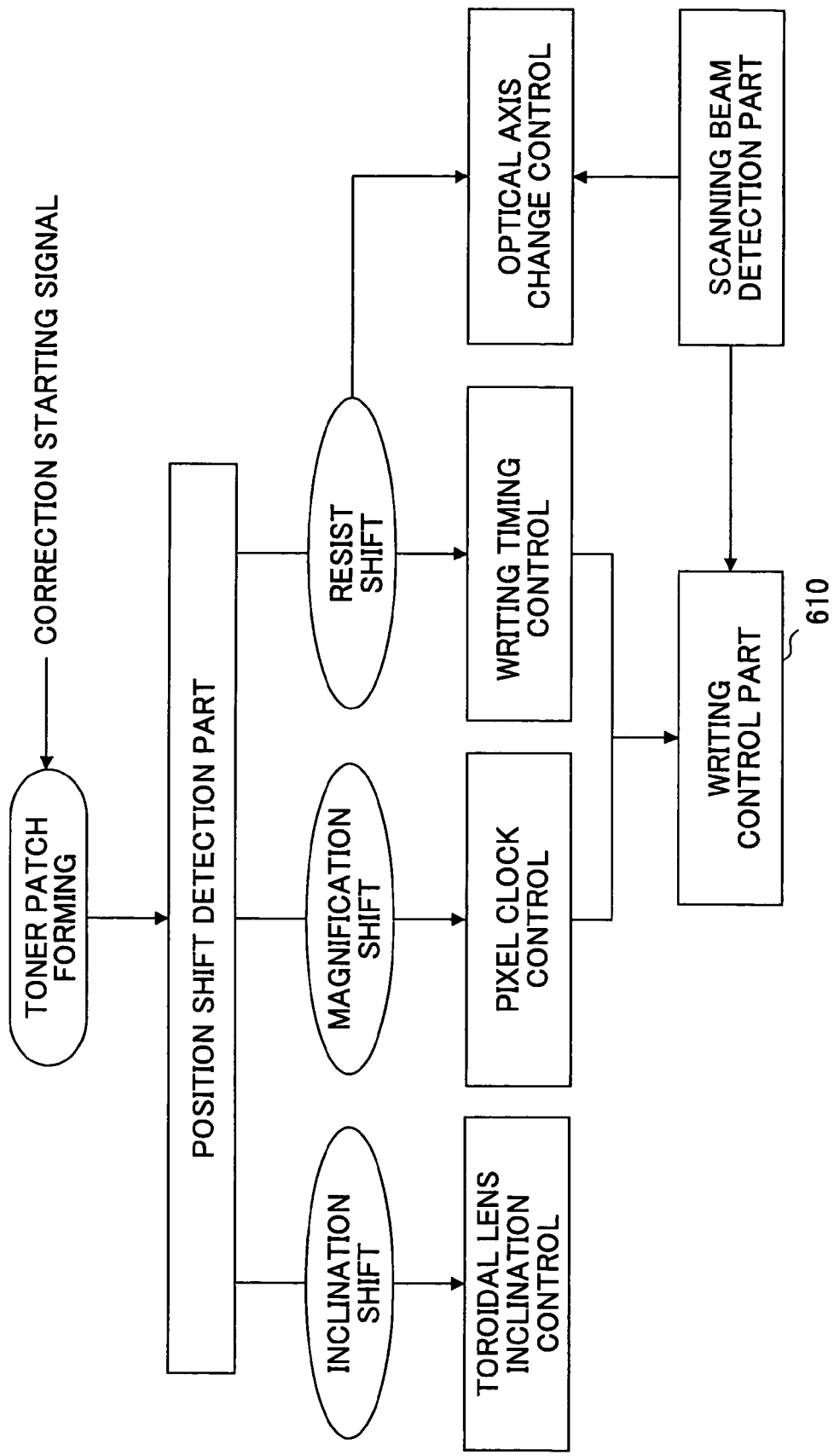
FIG. 9 is a block diagram showing an example of a beam spot position shift control process of the multiple-beam scanning device shown in FIG. 1.

FIG. 9 is a block diagram showing an example of a beam spot position shift control process of the multiple-beam scanning device shown in FIG. 1. At the designated timing such as when electric power is turned on, recovery time from a waiting state, or when a designated number of printed sheets have passed, overlap of the color images is detected by reading out a detection pattern 143 of a toner image formed on the transferring belt 105 shown in FIG. 1 by a detection part. Magnification and resist (registration) in the main scanning direction and inclination and resist in the sub-scanning direction are detected as a relative beam spot position shift between the stations wherein a specific station is standard. The resist in the main scanning direction is corrected by changing the timing when a synchronizing detection signal is generated. The magnification is corrected by changing an image clock modulating light emitting points.

Regarding the resist in the sub-scanning direction, first, a start writing timing for making the resist shift smallest is set for every one scanning cycle of the polygon mirror, namely 28 line pitch units in this example because the number of beams by the "N"th scanning of the polygon mirror is n×m−2k and the number of beams by the "N−1"th scanning is k. A start writing position of a head line is adjusted at a 1 line pitch unit by selecting the light emitting source forming the head line from plural light emitting sources. The inclination is corrected by operating the stepping motor 415 and inclining the toroidal lens part 405.

The detection part of the detection pattern 143 of the toner image is made by a light emitting element 154 for lighting such as an LED, a light receiving element for receiving light 155 such as a photo sensor, and a pair of condenser lenses 156. The detection part forms a line pattern inclining at approximately 45 degrees against the main scanning line and reads out detection timing difference corresponding to the moving of the transferring belt 105.

In this example, the detection parts are provided at three positions on the transferring belt 105, namely at a center part and left and right end parts of the transferring belt 105. The inclination is detected by the difference of the left and right end parts of the transferring belt 105 and the magnifications from the center part to the left and right end parts are detected, so that the correction is made for adjusting the standard station.

However, at the time of the correction mode, since the printing operation is interrupted, if this interruption frequently occurs, productivity of printing may be degraded or an excess of toner may be consumed. It is preferable that the number of these correction modes be small, in other words, that the beam spot position be stably held for a long time.

Figure 10:
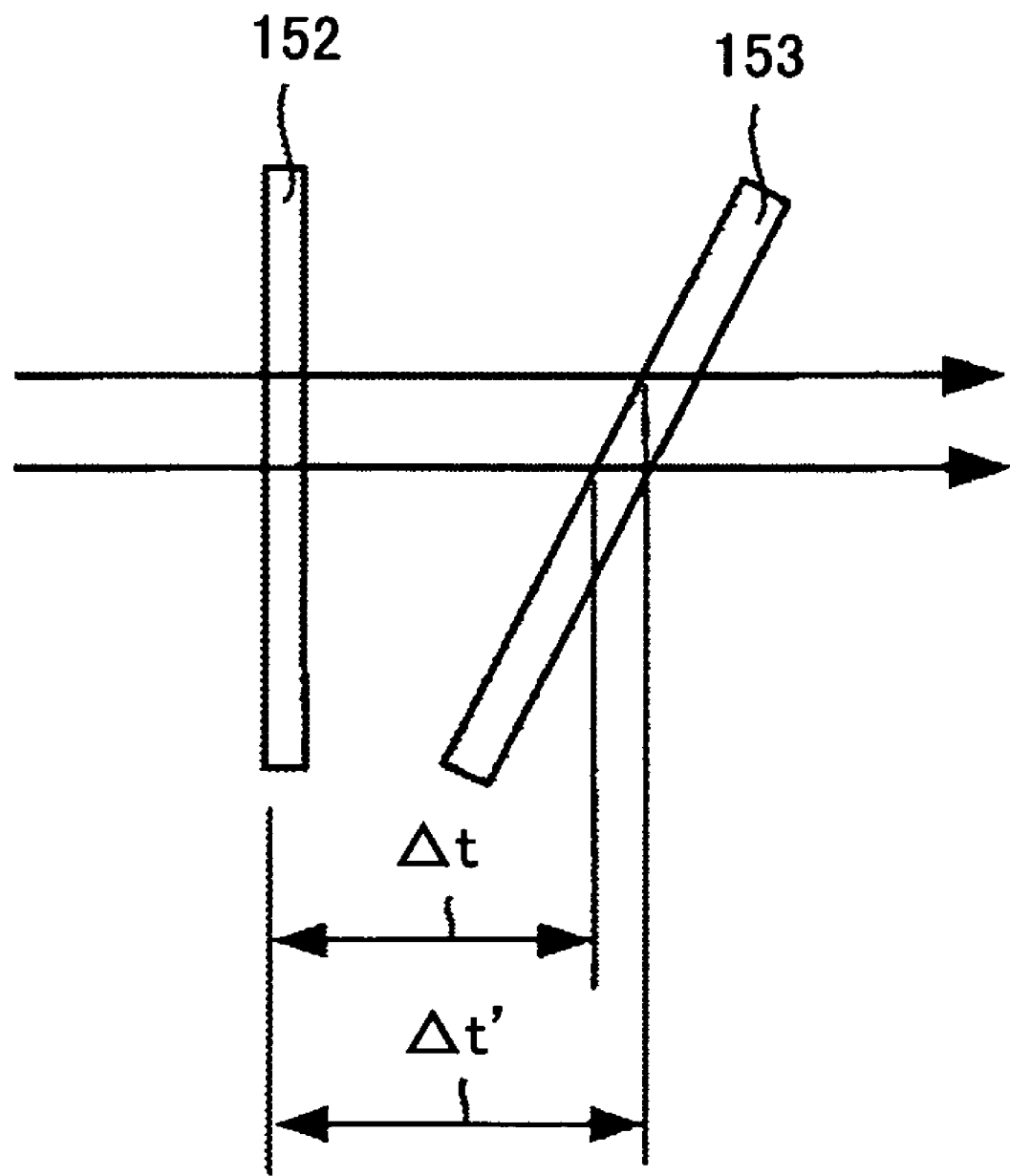
FIG. 10 is a view showing a structural example of an optical detection sensor.

FIG. 10 is a view showing a structural example of the optical detection sensor. In this example, as shown in FIG. 10, the optical detection sensor is formed by a photo diode 152 perpendicular to the main scanning direction and a photo diode 153 non-parallel with the main scanning direction. A time t0 when the light beam from the optical sensor at the scanning starting side reaches the photo diode 152 and a time t1 when the light beam from the optical sensor at the scanning starting side reaches the photo diode 153 are monitored. The change of the main scan magnification is corrected by resetting the standard value of an image clock operating in the correction mode by change of time "t0". By a change of the difference Δt between t0 and t1, the shift Δy of the sub scanning position of the light beam is detected and correction is made.

Here, the shift of the sub-scanning position is expressed by using an inclination angle γ of the photo diode 153 and the scanning speed V of the light beam, as follows.

$$\Delta y = (V/\tan \gamma) \cdot (\Delta t - \Delta t') = k \cdot P + \Delta P$$

A feed back correction is made for an element greater than the 1 line pitch P by selecting the light emitting source and for an excess ΔP less than 1 line pitch P by using the liquid crystal deflection element, so that a scanning position can be held to prevent the sub scanning resist of the color images from being shifted.

Figure 11:
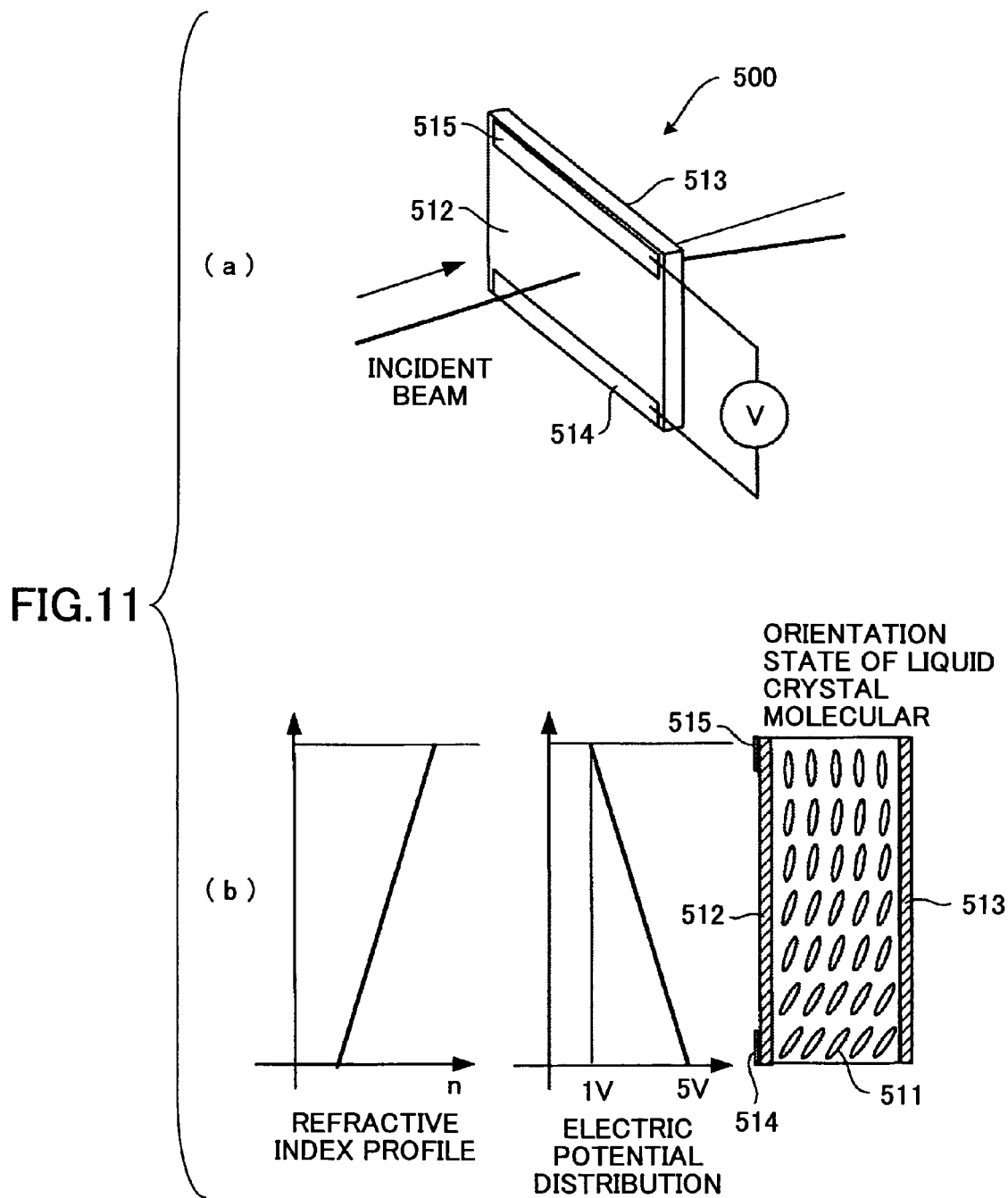
FIG. 11 is a view showing a liquid crystal deflection element as an optical axis deflection part.

FIG. 11 is a view showing liquid crystal deflection elements 117 and 118 as optical axis deflection parts.

As shown in FIG. 11(a) and FIG. 11(b), a liquid crystal deflection element 500 has a structure where liquid crystal 511 is provided between transparent glass plates 512 and 513. Electrodes 514 and 515 are formed on an upper surface and a lower surface of the glass plate 512. By applying a difference in electric potential between the electrodes 514 and 515, variation of the electric potential in the crystal liquid 511 is generated as shown in the cross-sectional view of FIG. 11(b). The orientation of liquid crystal 511 is changed so that a refractive index profile is generated as shown in FIG. 11(b) and an emission axis of the beam as well as the prism can be slightly inclined.

As the liquid crystal, nematic liquid crystal having dielectric anisotropy or the like is used. Therefore, by providing the electrodes in the sub-scanning direction, it is possible to change the scanning position on the photosensitive surface corresponding to an applied electric voltage.

Figure 12:
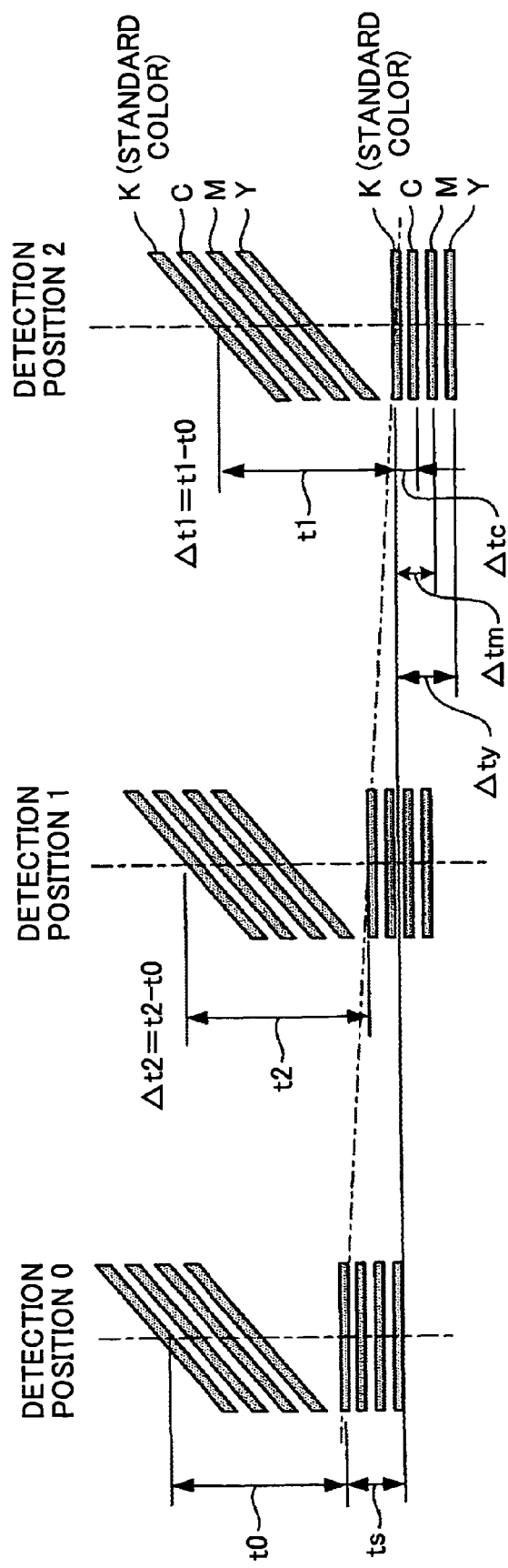
FIG. 12 is a view showing an example of a detection pattern of a toner image.

FIG. 12 is a view showing an example of a detection pattern 143 of the toner image shown in FIG. 1. This detection pattern is formed by a line group along the main scanning direction and a line group inclined at 45 degrees. The upper and lower surfaces of the sheet correspond to the moving direction of the transferring belt 105. In the detected positions, the position shifts in the sub-scanning directions of the colors are calculated from the difference between t1, t2 and t3 and an ideal value t0.

Figure 13:
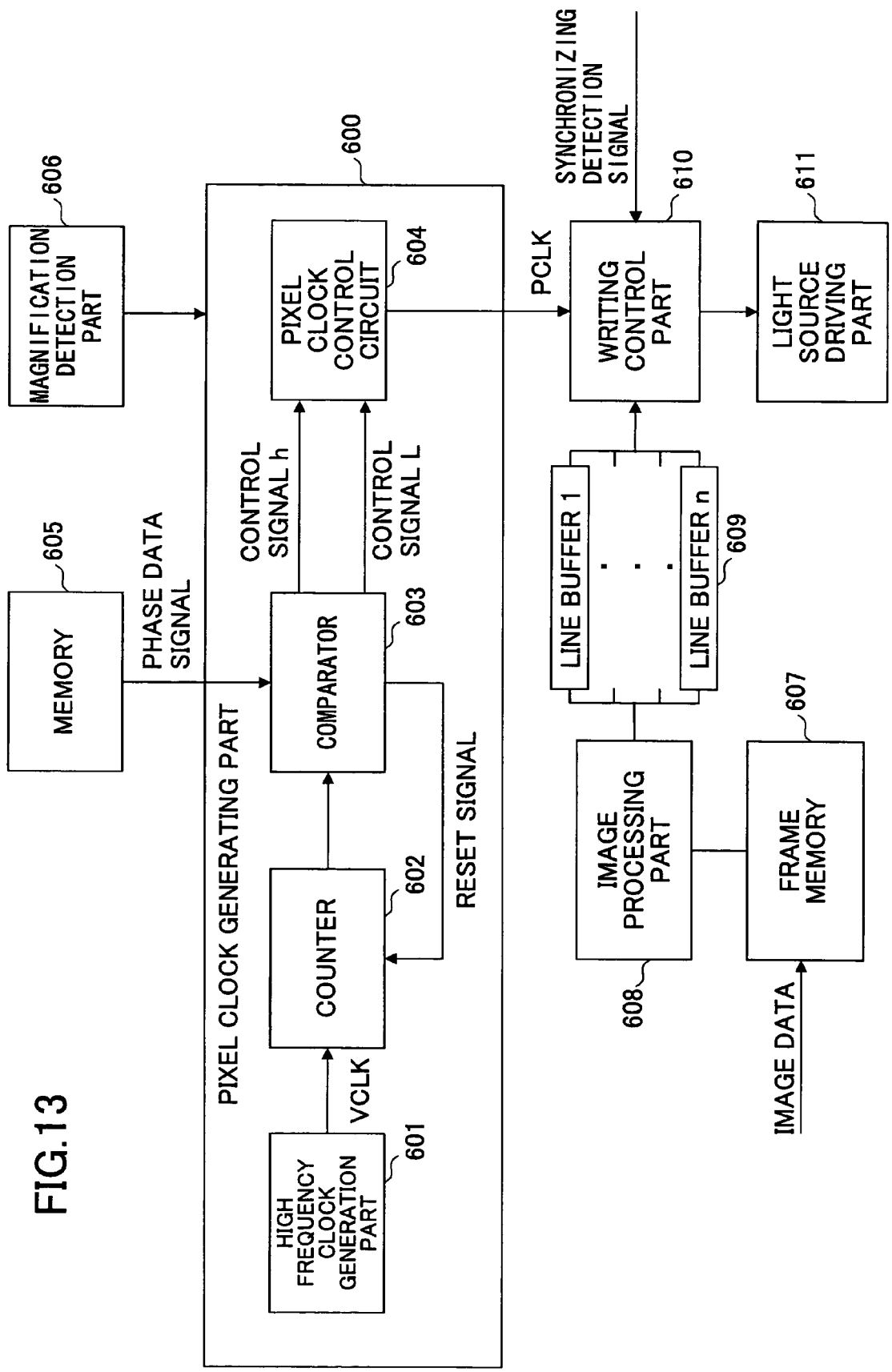
FIG. 13 is a block diagram showing a structural example of a writing control system.

FIG. 13 is a block diagram showing a structural example of a writing control system. Image data that are raster-developed for each of colors are stored in the frame memory 607 for a while and read out in order by the image processing part 608. Pixel data of the lines corresponding to the matrix pattern corresponding to a half tone with reference to a front and rear relationship are formed and transferred to the line buffer 609 corresponding to the light emitting points.

A writing control part 610 has the same numbers of line buffers 609 as the light emitting points of the semiconductor laser array. The writing control part 610 reads the pixel data from the line buffers 609 by using a synchronizing detection signal and controls a light source driving part 611, so that the light emitting points are independently modulated.

Therefore, the line buffers 609 transferring pixel data are selected in order so that the light emitting point recording the head line can be switched.

Next, a clock generation part 600 modulating the light emitting points is discussed. In a counter 602, a high frequency clock VCLK generated by a high frequency clock generating circuit 601 is counted. In a comparison circuit 603, this counted value, a value L preset based on a duty ratio, and phase data H provided from outside as transition timing of a pixel clock and configured to order a phase shift amount are compared with each other.

When the count value is consistent with the value L, a control signal L ordering fall of the pixel clock PCLK is output. When the count value is consistent with the phase data H, a control signal h ordering rise of the pixel clock PCLK is output. At this time, the counter 602 is reset simultaneously with the control signal h and the count is restarted from zero (0) so that a continuous pulse line is formed. Thus, the phase data H are provided for one clock so that the pixel clock PCLK wherein a pulse cycle becomes changeable is generated in order. In this example, the pixel clock PCLK is an eight-way divider of the high frequency clock VCLK and the phase can be changed by increments of ⅛ clock.

Figure 14:
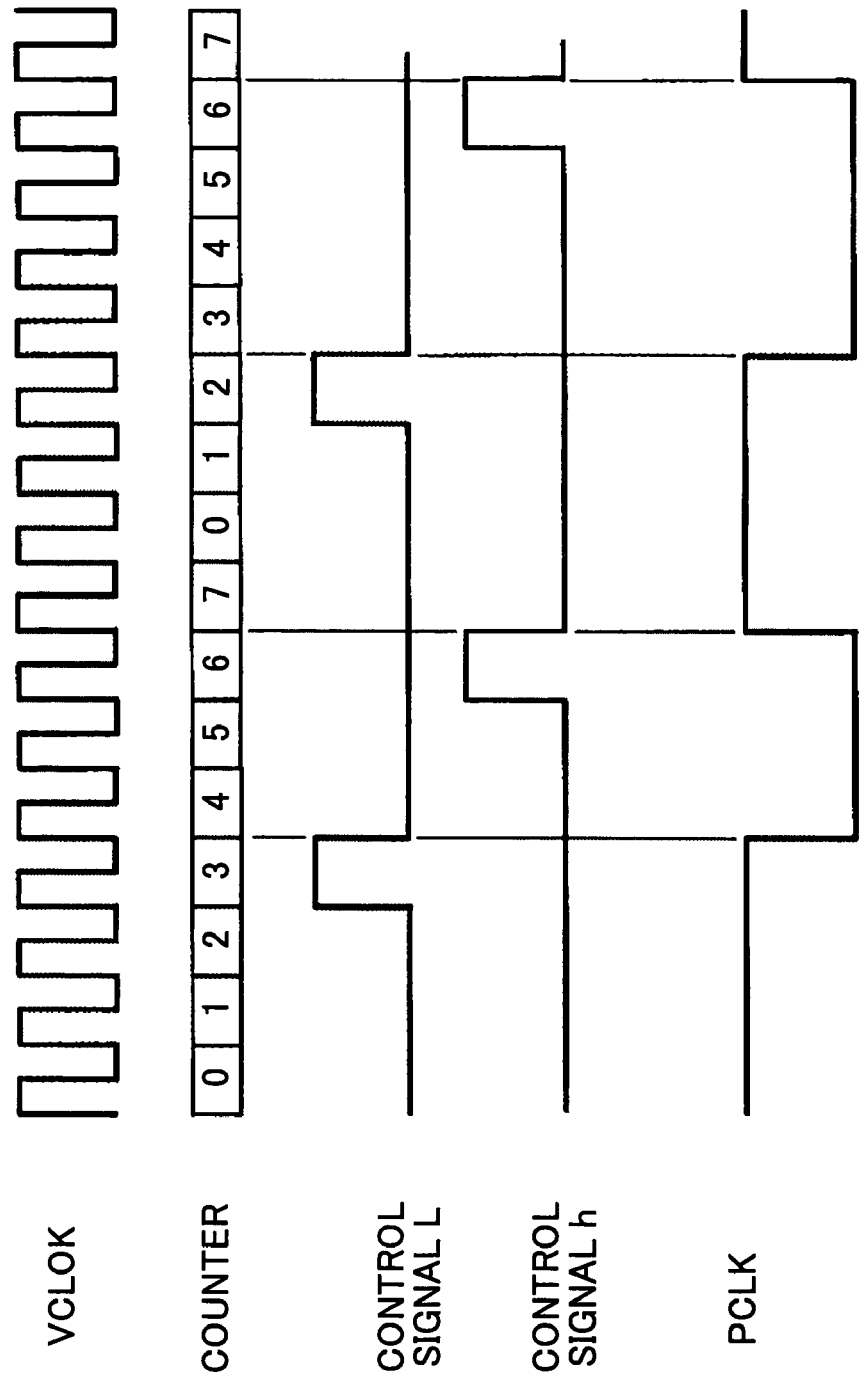
FIG. 14 is a graph showing where the phase of an optional pixel is shifted in the writing control system shown in FIG. 13.

FIG. 14 is a graph showing where a phase of an optional pixel is shifted in the writing control system shown in FIG. 13. In this example, the phase is delayed by ⅛ clock.

If the duty ratio is 50%, a value L=3 is given. Four counts are made by the counter 602 so that the pixel clock PCLK is started. If the phase is delayed at ⅛ clock, the phase data H=& is given so that the pixel clock PCLK is started at 7 counts. Simultaneously, since the counter is reset, the pixel clock PCLK is restarted at 4 counts. In other words, the neighboring pulse cycle is shortened by ⅛ clock.

The generated pixel clock PCLK is given to the writing control part 610. The writing control part 610 controls the light source driving part 611 by modulating data where the pixel data read out by the line buffer 609 are superposed on the pixel clock PCLK so as to drive the semiconductor laser of the light source units 107 and 109.

Thus, by arranging the pixels shifting the phase at designated gaps, condensation and non-condensation of the pixel gaps along the main scanning direction are adjusted so that the main scanning resist shift at the boundary of the divided sections becomes zero. As a result of this, deviation of the partial magnification can be corrected. In other words, the entire magnification is corrected by equally contracting and expanding pixel gaps by the shift of the pixel clock PCLK itself. As a result of this, the partial magnification can be corrected by changing the pixel gaps for every designated number of pixels.

Figure 15:
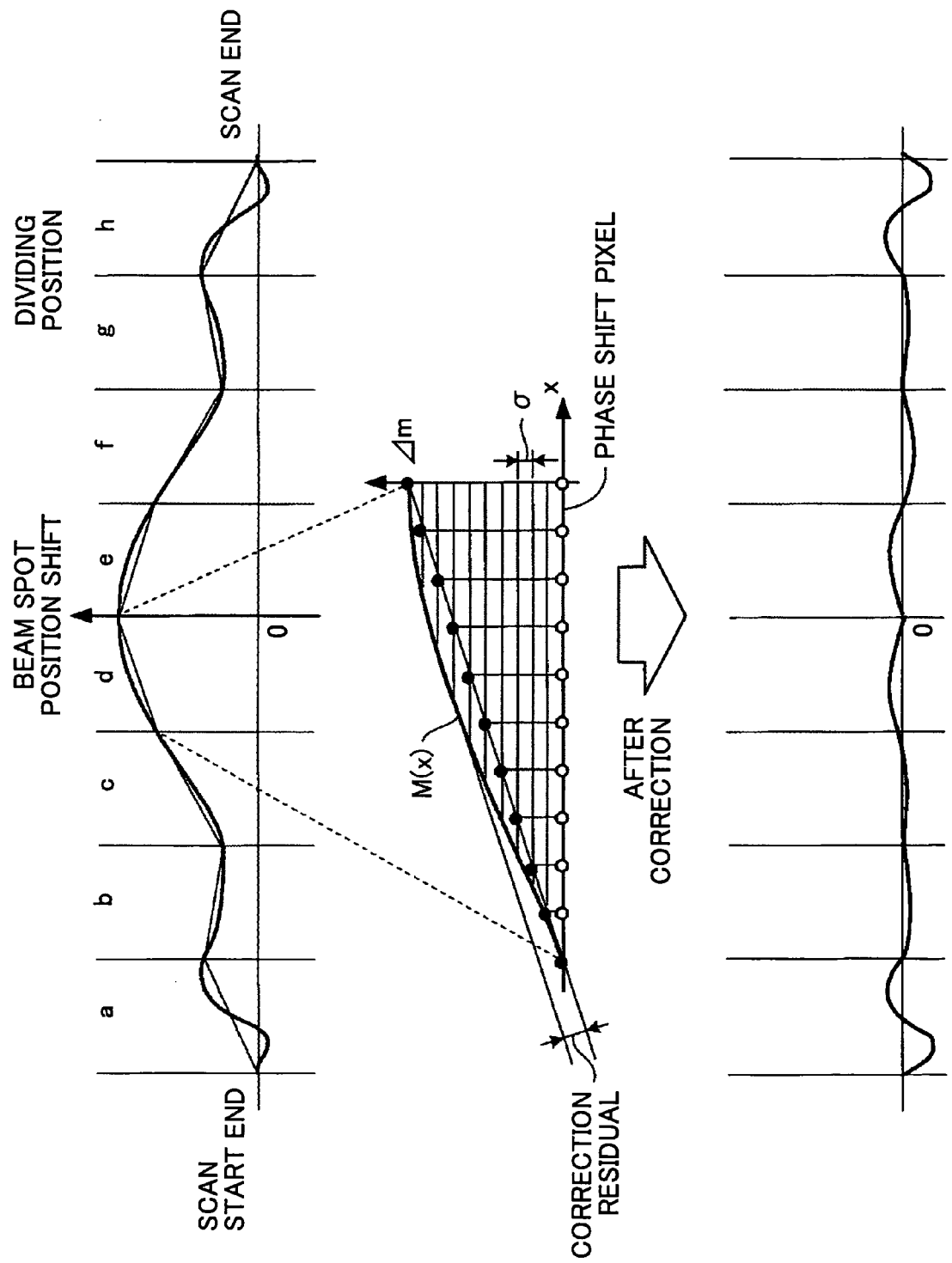
FIG. 15 is a graph showing a case where a main scanning area is divided into plural sections, an interval of a pixel shifting the phase for every divided section and a shift amount are set, and the interval of the pixel and the shift amount are applied for correction.

FIG. 15 is a graph showing a case where a main scanning area is divided into plural sections, an interval of a pixel shifting a phase for every divided section and a shift amount are set, and the interval of the pixel and the shift amount are applied for correction.

Change M(x) of the beam spot position shift is expressed by the following integral value wherein the change of the magnification along the main scanning direction x is expressed as L(x).

$$M(x) = \int L(x)dx$$

If the correction is made so that the beam spot position shift at the beginning part and ending part of a divided section becomes zero, the gap of the pixels shifting the phase is expressed as follows.

$$D(\text{integer number}) \doteq N/(\Delta m/\sigma)$$

Here, Δm is a gap of the divided section width accompanying the change of the magnification of the optional divided section, σ (constant) is resolution of the phase shift, and N is the number of pixels in the divided section. The phase may be shifted at σ for every D pixels. In this example, σ is ⅛ pixels.

The number of divisions may be preset so that the beam spot position shift residual generated in an intermediate position of the divided section may be within the allowable range. The width of divided section may be not equal dividing but offset dividing.

Figure 16:
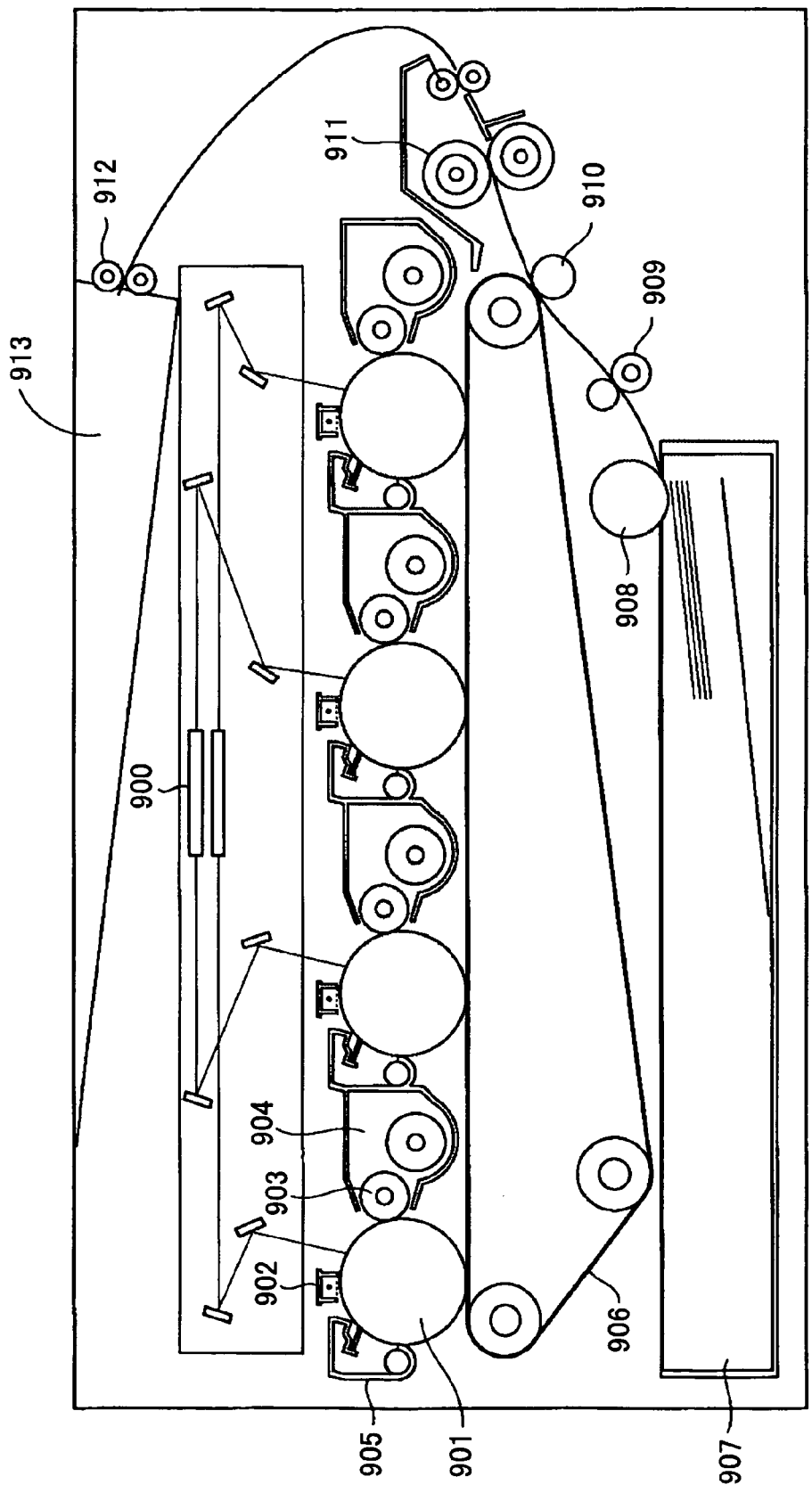
FIG. 16 is a schematic structural view of an image forming apparatus of the embodiment of the present invention.

FIG. 16 is a schematic structural view of an image forming apparatus having the above-discussed optical scanning device (multi-beam scanning device) of the embodiment of the present invention.

This image forming device is a tandem type color image forming device where four photosensitive drums 901 are arranged along an intermediate transferring belt 906 forming a transferring part. Around the photosensitive drum 901 forming an image forming part of a color (image forming station), there are a charger 902 configured to charge the photosensitive drum 901 at a high voltage, a developing device 904 configured to adhere charged toner to an electrostatic latent image recorded by the optical scanning device 900, a cleaning device 905 configured to remove and store toner remaining on the photosensitive drum 901 after the transferring, and others.

The developing device 904 uses a two-ingredient developer made of the toner and a carrier or a single-ingredient developer made of the toner. The developing device 904 includes a developing roller 903 configured to carry and convey the developer, an agitating and conveying member configured to agitate and convey the developer, a toner cartridge (not shown) configured to supply the toner in the device, and others. Only color of the toner used by the developing device 904 is different in each of the image forming stations, and each of the image forming stations has the same structure.

After image forming operations are started, by scanning for every single surface of the polygon mirror of the optical scanning device 900, image recording of plural lines, four lines in this example, are simultaneously made onto the photosensitive drum 901 of the image forming station of each color, so that an electrostatic latent image corresponding to each color is formed.

The image forming stations are arranged along a moving direction of the intermediate transferring belt 906. The electrostatic latent images of the photosensitive drums 901 of each of the image forming stations are developed by the toners of the corresponding colors of the developing devices 904, and thereby, for example, toner images of yellow, magenta, cyan, and black are formed. The toner images of yellow, magenta, cyan, and black formed on four photosensitive drums 901 are first transferred (primary transfer) onto the intermediate transferring belt 905 by adjusting timing and superposed so that a full color image is formed.

On the other hand, accompanying the image forming operation, a recording medium such as a recording sheet is supplied from a sheet feeding tray 907 by a sheet feeding roller 908. The recording medium is sent to a secondary transferring part by matching the timing when recording in the sub-scanning direction is started by the resist rollers 903. The full color image is then transferred (secondary transfer) to the recording medium from the intermediate transferring belt 906 by a secondary transferring device 910 such as a transferring roller. The recording medium where the full color image is transferred is conveyed to a fixing device 911 and the full color image is fixed to the recording medium by a fixing roller and a pressing roller of the fixing device 911. The recording medium after the full color image is fixed is discharged to a sheet discharge tray 913 by a discharge roller 912.

Residual toner remaining on each of the photosensitive drums 901 after primary transferring is removed by a cleaning device 905. In addition, a cleaning device not shown in FIG. 16 is provided at the intermediate transferring belt 906. Residual toner remaining on the intermediate transferring belt 906 after secondary transferring is removed by the cleaning device not shown in FIG. 16.

While an example of the image forming device of the present invention is discussed above, the structure of the image forming device of the present invention is not limited to one shown in FIG. 16. For example, in the example shown in FIG. 16, the intermediate transferring belt 906 and the secondary transferring device 910 are used. However, the present invention can be applied to a direct transferring type tandem type color image forming device. In the direct transferring type tandem type color image forming device, a transferring belt configured to carry and convey the recording medium, instead of the intermediate belt, may be used. The above-discussed four image forming stations may be arranged along this transferring belt. The toner images of yellow, magenta, cyan, and black formed on the photosensitive body 901 of the image forming station may be directly superposed on the recording medium carried and conveyed by the transferring belt and transferred. The color image is fixed by the fixing device. Since this direct transferring type tandem type color image forming device does not require the secondary transferring device, it is possible to reduce manufacturing cost and achieve miniaturization of the device.

The transferring belt 105 shown in FIG. 1 corresponds to the intermediate transferring belt 906 of the intermediate transferring type color image forming device shown in FIG. 16 and the transferring belt configured to carry and convey the recording medium in the direct transferring type tandem type color image forming device. Therefore, the examples discussed with reference to FIG. 1 through FIG. 15 can be applied to the intermediate transferring type color image forming device and the direct transferring type tandem type color image forming device.

According to the above-discussed embodiment of the present invention, it is possible to provide a multi-beam scanning device, including: a light source part having a plurality of light emitting sources which light emitting sources are monolithically arranged in a surface perpendicular to an optical axis; a light deflection part configured to deflect a plurality of light beams from the light source part in a lump and scan an image carrier surface; and an image-formation optical system where lateral magnification is set so that beam spots of the plural light beams are arranged at a designated pitch in a sub-scanning direction on the image carrier surface; wherein the image carrier surface is moved in the sub-scanning direction corresponding to main scanning by the light deflection part; and image forming is implemented so that a boundary part of a scanning area scanned on an optional surface of the light deflection part and a scanning area scanned on a neighboring surface are overlapped at least by one scanning line gap on the image carrier surface.

The scanning line on the optional polygon mirror and the scanning line on the neighboring surface are mixed at plural rows. Therefore, even if vibration or an optical face tangle error of the polygon mirror occurs, it is difficult to distinguish a connection part of the scanning area of each surface. Hence, it is possible to form an image with high quality without uneven density or color change.

Image forming may be implemented so that, in the overlapping area, the number of scanning lines by a light beam scanned on the optional surface of the light deflection part matches the number of scanning lines by a light beam scanned on the neighboring surface.

By making the width of an overlapping part of a head and an end in the sub-scanning direction in the scanning area of the surfaces of the polygon mirror the same, only a change of the scanning frequency of the polygon mirror is required. In addition, the light emitting source scanning the overlapping area is specified and it is not necessary to distinguish the pixel of the connection part. Hence, it is possible to form an image with high quality without uneven density, color change or operation of complex controls.

Image forming may be implemented so that, in the overlapping area, a scanning position of a light beam scanned on the optional surface of the light deflection part is not overlapped with a scanning position of a light beam scanned on the neighboring surface.

Compared to a case where the same scanning position is scanned, even if the trace of the scanning line is changed due to the optical face tangle error or vibration of the polygon mirror, it is possible to make distinguishing of a density change difficult. Hence, it is possible to form an image with high quality without uneven density and with no color change.

Image forming may be implemented so that, in the overlapping area, scanning lines by a light beam scanned on the optional surface of the light deflection part and scanning lines by a light beam scanned on the neighboring surface are mutually mixed on the image carrier surface.

Since the connection part of the scanning area of the surface can be made vague, it is possible to avoid condensation of the scanning line gap that may be easily observed by human eyes or spatial frequency of density change. Hence, it is possible to form an image with high quality without uneven density and with no color change.

The spots of the plural light beams on the image carrier surface may be arranged so that a sub-scanning pitch in the overlapping area and a sub-scanning pitch in another area are different.

For example, where the sub-scanning gap of the spots corresponding to the overlapping area is wider than the gap of the spots corresponding to another area, it is possible to arrange the scanning line scanned by the neighboring surface at an intermediate position of the scanning line scanned and recorded by the optional surface by only selecting the scanning frequency of the polygon mirror. Hence, it is possible to form an image with high quality without uneven density, color change, or operation of complex controls.

The light source part may have a structure where the plural light emitting sources are arranged so that a pitch of a light emitting source scanning the overlapping area is an integral multiple (>1) of a pitch of a light emitting source scanning another area.

The sub-scanning gap of the spots corresponding to the overlapping area can be an integral multiple of the spot gap corresponding to another area. The spot gap corresponding to another area is made to the scanning line pitch corresponding to the recording density. As a result of this, it is possible to form an image at the scanning line pitch corresponding to the recording density, in the overlapping area. Therefore, it is possible to form an image with high quality without uneven density and with no color change.

The light source part may have a structure where the plural the light emitting sources are two-dimensionally arranged; and dummy light emitting sources not used for image forming may be provided at least a head line and an end line in the sub-scanning direction.

By selectively using the light emitting source, for example, every other light emitting source or plural light emitting sources, it is possible to match with the spatial frequency that is difficult to be found and freely set the line number included in the overlapping area. Hence, it is not necessary to individually prepare a two dimensional array element as a light source part and the light source part can be commonly used. Therefore, it is possible to improve productivity.

Beam intensities of the spots of the plural light beams on the image carrier surface may be arranged to be different between the overlapping area and another area.

The beam intensities are preset whether the light emitting source scans the overlapping area or another area so that the density of the area is even. Hence, it is possible to form an image with high quality without uneven density, color change, or operation of complex controls.

The plural image carrier surfaces may be scanned by a common light deflection part; and the number of scanning lines included in the overlapping area may be arranged so that image forming is implemented. The light deflection part may be a polygon scanner using a polygon mirror.

Since the scanning frequency of the polygon mirror can be arranged on the image carrier surface for the number of the light emitting sources, it is possible to make the polygon scanner scanning plural image carrier surfaces common and the structure of a component can be simplified. Hence, it is possible to improve productivity.

According to the above-discussed embodiment of the present invention, it is possible to provide an image forming device, including: an optical scanning device configured to deflect a light beam from a light source part by a light deflection part; an image carrier where an electrostatic latent image is formed by the light beam; a developing part configured to develop the electrostatic latent image on the image carrier by a developer; and a transferring part configured to transfer the image developed on the image carrier to a recording medium directly or via an intermediate transferring body; wherein the multi-beam scanning device as claimed in claim 1 is provided as the optical scanning device.

Even if there is vibration or face tangle of a polygon mirror forming the polygon scanner, it is possible to realize an image forming device whereby it is possible to form an image with high quality without uneven density and with no color change.

A plurality of image forming parts including the image carrier and the developing part may be provided along the transferring part; images having different developing colors may be formed on the image carrier by the image forming part; and the transferring part may transfer an image of each color formed on the image carrier to the recording medium directly or via an intermediate transferring body, so that a multi-color or a non-monochrome image is formed.

In the tandem type image forming device configured to overlap toner images formed on plural image carrier surfaces and form a color image, it is not necessary to control individually corresponding to the image carrier surface. Hence, the optical deflection part or the light source part can be commonly used so that productivity can be improved.

The image carrier may be a photosensitive body having photoconductivity.

The present invention is not limited to these embodiments, but variations and modifications may be made without departing from the scope of the present invention.

This patent application is based on Japanese Priority Patent Application No. 2005-370047 filed on Dec. 22, 2005, the entire contents of which are hereby incorporated by reference.

What is claimed is:

1. A multi-beam scanning device, comprising:
   a light source part having a plurality of light emitting sources, the light emitting sources being monolithically arranged in a surface perpendicular to an optical axis;

a light deflection part configured to deflect a plurality of light beams from the light source part in a group and scan an image carrier surface; and an image-formation optical system where lateral magnification is set so that beam spots of the plural light beams are arranged to be spaced at a designated pitch in a sub-scanning direction on the image carrier surface so as to match with a scanning line pitch corresponding to a recording density of the image carrier surface;

wherein the image carrier surface is moved in the sub-scanning direction corresponding to main scanning by the light deflection part; and image forming is implemented so that a boundary part of a scanning area scanned on a first surface of the light deflection part and a boundary part of a scanning area scanned on a neighboring surface are overlapped on the image carrier surface, and wherein the boundary parts are overlapped at least by one scanning line gap on the image carrier surface, and wherein another part of the scanning area scanned on the first surface of the light deflection part is not overlapped on the image carrier surface, and wherein said multi-beam scanning device is arranged such that a non-overlapped region is formed on the image carrier surface by scanning a group of beam spots arrayed with a pitch of one line on the first surface of the light deflection part, and an overlapped region is formed on the image carrier surface by scanning groups of beam spots each with a pitch of plural lines, with one of the groups being scanned on the first surface and another one of the groups being scanned on the neighboring surface, and wherein the pitches of plural lines are between adjacent beam spots on the respective first and neighboring surfaces of the light deflection part.

2. The multi-beam scanning device as claimed in claim 1, wherein image forming is implemented so that, in the overlapping area, the number of scanning lines by a light beam scanned on the first surface of the light deflection part matches the number of scanning lines by a light beam scanned on the neighboring surface.

3. The multi-beam scanning device as claimed in claim 1, wherein image forming is implemented so that, in the overlapping area, a scanning position of a light beam scanned on the first surface of the light deflection part is not overlapped with a scanning position of a light beam scanned on the neighboring surface.

4. The multi-beam scanning device as claimed in claim 3, wherein image forming is implemented so that, in the overlapping area, scanning lines by a light beam scanned on the first surface of the light deflection part and scanning lines by a light beam scanned on the neighboring surface are mutually mixed on the image carrier surface.

5. The multi-beam scanning device as claimed in claim 1, wherein the spots of the plural light beams on the image carrier surface are arranged so that a sub-scanning pitch in the overlapping area and a sub-scanning pitch in another area are different.

6. The multi-beam scanning device as claimed in claim 5, wherein the light source part has a structure where the plural light emitting sources are arranged so that a pitch of a light emitting source scanning the overlapping area is an integral multiple (>1) of a pitch of a light emitting source scanning another area.

7. The multi-beam scanning device as claimed in claim 6, wherein the light source part has a structure where the plural light emitting sources are two-dimensionally arranged; and dummy light emitting sources not used for image forming are provided at least a head line and an end line in the sub-scanning direction.

8. The multi-beam scanning device as claimed in claim 1, wherein beam intensities of the spots of the plural light beams on the image carrier surface are arranged to be different between the overlapping area and another area.

9. The multi-beam scanning device as claimed in claim 1, wherein plural image carrier surfaces are scanned by a common light deflection part; and the number of scanning lines included in the overlapping area is arranged so that image forming is implemented.

10. The multi-beam scanning device as claimed in claim 1, wherein the light deflection part is a polygon scanner using a polygon mirror.

11. An image forming device, comprising:
an optical scanning device configured to deflect light beams, said device including a multi-beam scanning device, and said multi-beam scanning device including:
a light source part having a plurality of light emitting sources, the light emitting sources being monolithically arranged in a surface perpendicular to an optical axis;
a light deflection part configured to deflect the light beams from the light source part in a group and scan an image carrier surface; and
an image-formation optical system where lateral magnification is set so that beam spots of the plural light beams are arranged to be spaced at a designated pitch in a sub-scanning direction on the image carrier surface so as to match with a scanning line pitch corresponding to a recording density of the image carrier surface;
wherein the image carrier surface is moved in the sub-scanning direction corresponding to main scanning by the light deflection part; and
image forming is implemented so that a boundary part of a scanning area scanned on a first surface of the light deflection part and a boundary part of a scanning area scanned on a neighboring surface are overlapped on the image carrier surface, and wherein the boundary parts are overlapped at least by one scanning line gap on the image carrier surface and wherein another part of the scanning area scanned on the first surface of the light deflection part is not overlapped on the image carrier surface, and wherein said multi-beam scanning device is arranged such that a non-overlapped region is formed on the image carrier surface by scanning a group of beam spots arrayed with a pitch of one line on the first surface of the light deflection part, and an overlapped region is formed on the image carrier surface by scanning groups of beam spots each with a pitch of plural lines, with one of the groups being scanned on the first surface and another one of the groups being scanned on the neighboring surface, and wherein the pitches of plural lines are between adjacent beam spots on the respective first and neighboring surfaces of the light deflection part;
an image carrier where an electrostatic latent image is formed by the light beams;
a developing part configured to develop the electrostatic latent image on the image carrier by a developer; and
a transferring part configured to transfer the image developed on the image carrier to a recording medium directly or via an intermediate transferring body.

12. The image forming device as claimed in claim 11, wherein a plurality of image forming parts including the image carrier and the developing part is provided along the transferring part; images having different developing colors are formed on the image carrier by the image forming part; and the transferring part transfers an image of each color formed on the image carrier to the recording medium directly or via an intermediate transferring body, so that a multi-color or a non-monochrome image is formed.

13. The image forming device as claimed in claim 11, wherein the image carrier is a photosensitive body having photoconductivity.

* * * * *